(12) United States Patent
Mimassi

(10) Patent No.: US 11,521,171 B2
(45) Date of Patent: Dec. 6, 2022

(54) SYSTEM AND METHOD FOR A RESTAURANT AS A SERVICE PLATFORM

(71) Applicant: RockSpoon, Inc., San Jose, CA (US)

(72) Inventor: Nagib Georges Mimassi, Palo Alto, CA (US)

(73) Assignee: ROCKSPOON, INC., San Jose, CA (US)

(*) Notice: Subject to any disclaimer, the term of this patent is extended or adjusted under 35 U.S.C. 154(b) by 0 days.

(21) Appl. No.: 17/473,552

(22) Filed: Sep. 13, 2021

(65) Prior Publication Data

US 2021/0406815 A1 Dec. 30, 2021

Related U.S. Application Data

(63) Continuation-in-part of application No. 17/408,449, filed on Aug. 22, 2021, and a continuation-in-part of application No. 17/223,192, filed on Apr. 6, 2021, and a continuation-in-part of application No. 17/216,360, filed on Mar. 29, 2021, said application No. 17/408,449 is a continuation of application No. 17/153,213, filed on Jan. 20, 2021, now Pat. No. 11,276,035, said application No. 17/216,360 is a continuation of application No. 17/037,200, filed on Sep. 29, 2020, which is a continuation-in-part of application No. 16/993,488, filed on Aug. 14, 2020, said application No. 17/408,449 is a continuation of application No. 16/993,488, filed on Aug. 14, 2020, said application No. 17/223,192 is a continuation of application No. 16/898,839, filed on Jun. 11, 2020, now Pat. No. 10,977,606, which is a continuation of application No. 16/796,505, filed on Feb. 20, 2020.

(Continued)

(51) Int. Cl.
| | | |
|---|---|---|
| *G06Q 30/00* | (2012.01) | |
| *G06Q 10/08* | (2012.01) | |
| *G06Q 50/12* | (2012.01) | |
| *G06Q 10/06* | (2012.01) | |
| *G06Q 20/20* | (2012.01) | |

(52) U.S. Cl.
CPC ... *G06Q 10/087* (2013.01); *G06Q 10/063118* (2013.01); *G06Q 20/203* (2013.01); *G06Q 50/12* (2013.01)

(58) Field of Classification Search
CPC .............. G06Q 10/087; G06Q 10/063118
USPC .................................................. 705/15
See application file for complete search history.

(56) References Cited

U.S. PATENT DOCUMENTS

| | | |
|---|---|---|
| 10,827,020 B1 | 11/2020 | Cao et al. |
| 2005/0004843 A1 | 1/2005 | Heflin |

(Continued)

*Primary Examiner* — Rokib Masud
(74) *Attorney, Agent, or Firm* — Galvin Patent Law LLC; Brian R. Galvin; Brian S. Boon

(57) ABSTRACT

A system and method for a restaurant-as-a-service system, comprising one or more database(s), a cluster manager, and a platform which provides restaurants automated, multiple-domain spanning, intelligent business predictions and optimizations leveraging modular, highly integrable microservices which perform various domain-specific functions and tasks to enhance restaurant operations and patron experience. The cluster manager may intercept data requests and algorithmically forward requests to the appropriate microservice operating on an available cluster of computing devices.

6 Claims, 12 Drawing Sheets

Related U.S. Application Data

(60) Provisional application No. 63/162,368, filed on Mar. 17, 2021, provisional application No. 63/143,326, filed on Jan. 29, 2021, provisional application No. 63/005,899, filed on Apr. 6, 2020, provisional application No. 62/956,293, filed on Jan. 1, 2020, provisional application No. 62/956,289, filed on Jan. 1, 2020, provisional application No. 62/938,822, filed on Nov. 21, 2019, provisional application No. 62/938,835, filed on Nov. 21, 2019.

(56) References Cited

U.S. PATENT DOCUMENTS

| | | | | |
|---|---|---|---|---|
| 2009/0048890 A1* | 2/2009 | Burgh | ............... | G06Q 10/06375 705/7.26 |
| 2014/0108081 A1* | 4/2014 | Burns | ................... | G06Q 10/06 705/7.15 |
| 2014/0379432 A1* | 12/2014 | Goldman | ........... | G06Q 30/0206 705/7.35 |

* cited by examiner

SYSTEM AND METHOD FOR A RESTAURANT AS A SERVICE PLATFORM

CROSS-REFERENCE TO RELATED APPLICATIONS

Priority is claimed in the application data sheet to the following patents or patent applications, the entire written description of each of which is expressly incorporated herein by reference in its entirety:
Ser. No. 17/223,192
Ser. No. 16/898,839
62/938,835
Ser. No. 16/796,505
62/938,822
Ser. No. 17/216,360
63/143,326
Ser. No. 17/037,200
62/956,293
Ser. No. 16/993,488
62/956,289
Ser. No. 17/408,449
63/162,368
Ser. No. 16/993,488
Ser. No. 17/153,213
63/005,899

BACKGROUND

Field of the Art

The disclosure relates to the field of restaurant management, and more particularly to the field of real-time, distributed restaurant management microservices.

Discussion of the State of the Art

A study by Ohio State University on restaurant failure rates found that sixty percent of restaurants do not make it past their first year and close to eighty percent close within just five years of their grand opening. Running a restaurant, or any business enterprise, requires time, labor, leadership, planning, improvising, adapting, and little bit of luck, this is especially the case for first time owners and managers. For example, a head chef finally purchases his own restaurant where he can be a chef/owner, but despite his vast knowledge and experience about the kitchen and back-of-house operations, he may not be confident in certain aspects of running a business such as payroll, taxes, or managing front-of-house employees. The head chef would benefit from system that could offer system services related to various aspects of managing a restaurant.

What is needed is a system and method for a restaurant-as-a-service system, which provides restaurants automated, multiple-domain spanning, intelligent business predictions and optimizations leveraging modular, highly integrable microsystems which perform various domain-specific functions and tasks to enhance restaurant operations and patron experience.

SUMMARY

Accordingly, the inventor has conceived and reduced to practice, a system and method for a restaurant-as-a-service system, comprising one or more database(s), a cluster manager, and a platform which provides restaurants automated, multiple-domain spanning, intelligent business predictions and optimizations leveraging modular, highly integrable microsystems which perform various domain-specific functions and tasks to enhance restaurant operations and patron experience. The cluster manager may intercept data requests and algorithmically forward requests to the appropriate microservice operating on an available cluster of computing devices.

According to a preferred embodiment, a system for restaurant-as-a-service platform is disclosed, comprising: a cluster of computing devices wherein each computing device comprise a memory and at least one processor, wherein the cluster of computing devices comprise a plurality of programming instructions stored in the memories of, and operating on at least one processor of, the cluster of computing devices, wherein the plurality of programming instructions, when operating on the at least one processor, cause the cluster of computing devices to provide the following: a real-time financial microservice which: receive a financial action request; receive, responsive to the received financial action request, a plurality of stored and third-party data comprising financial, inventory, staff, and patron related information and use machine-learning to: analyze at least a portion of the received data to determine real-time patron attendance and to predict future patron attendance; analyze at least a portion of the received data to determine real-time cash flow and to predict future cash flow; receive payment data, the payment data comprising at least one of: a payor name, a payor address, a payee identifier, an invoice identifier, or a payment amount; retrieve a stored payee profile, the stored payee profile comprising at least one of: a payee name, a payee address, an open invoice, a balance due, or payment preference information; and transmit payment information to a payment processing system, the payment information being based on the payment data and the payment transaction; and an advanced inventory management microservice which: receive an inventory request; receive, responsive to the received inventory request, a plurality of stored and third-party data comprising inventory, patron, supplier, social media, and business information and use machine-learning to: analyze at least a portion of the received data to determine the quantity of items to be purchased and to predict future inventory requirements; analyze at least a portion of the received data to determine optimal inventory levels; generate a plurality of inventory adjustment suggestions based on the determined quantity of times to be purchased, patron data, inventory data, and third-party data comprising at least one of: local news and events, current and forecasted weather, a social media posting, or a rating or review; generate a smart shopping list based on the determined quantity of items to be purchased and the inventory adjustment suggestions; and analyze at least a portion of the received data to determine a break-even point and to predict a dynamic point of reorder; and a food production management microservice which: receive a food order request; coordinates the preparation of food items in a food order in a food preparation area; generates a predicted food order ready time; coordinates the packaging of the food items in the food order; and generates a predicted packaged food order ready time; and an operations microservice which: receive a reservation request; retrieve, responsive to the received reservation request, historical seating data from a database, the historical seating data comprising at least restaurant-specific history data; retrieve current seating data comprising information describing a plurality of patrons that are currently seated at tables in the restaurant; calculate a preliminary table turn-time estimate comprising an estimate of when a table will become available to satisfy the request for a reservation, wherein the preliminary table turn-time estimate is based at least in part on the historical seating data, the current seating data, and the request for a reservation; monitor the current seating data for changes and produce an updated table turn-time estimate based on any changes as they occur; and update the stored seating data based on the current seating data and the request for a reservation; and a cluster manager comprising at least a plurality of programming instructions stored in the memory of, and operating on at least one processor of, the cluster of computing devices, wherein the plurality of programming instructions, when operating on the at least one processor, cause the cluster of computing devices to: receive a plurality of requests from client devices; decrypt received encrypted requests; designate at least one or more of the cluster of computing devices to receive at least one of the plurality of requests using a load balancing algorithm; and transmit the at least one of the plurality of requests to the designated at least one or more cluster of computing devices for processing by a microservice stored and operating on one or more of the cluster of computing devices.

According to an embodiment, a method for restaurant-as-a-service platform is disclosed, comprising the steps of: receiving a financial action request; receiving, responsive to the received financial action request, a plurality of stored and third-party data comprising financial, inventory, staff, and patron related information and use machine-learning to: analyzing at least a portion of the received data to determine real-time patron attendance and to predict future patron attendance; analyzing at least a portion of the received data to determine real-time cash flow and to predict future cash flow; receiving payment data, the payment data comprising at least one of: a payor name, a payor address, a payee identifier, an invoice identifier, or a payment amount; retrieving a stored payee profile, the stored payee profile comprising at least one of: a payee name, a payee address, an open invoice, a balance due, or payment preference information; transmitting payment information to a payment processing system, the payment information being based on the payment data and the payment transaction; receiving an inventory request; receiving, responsive to the received inventory request, a plurality of stored and third-party data comprising inventory, patron, supplier, social media, and business information and use machine-learning to: analyzing at least a portion of the received data to determine the quantity of items to be purchased and to predict future inventory requirements; analyzing at least a portion of the received data to determine optimal inventory levels; generating a plurality of inventory adjustment suggestions based on the determined quantity of times to be purchased, patron data, inventory data, and third-party data comprising at least one of: local news and events, current and forecasted weather, a social media posting, or a rating or review; generating a smart shopping list based on the determined quantity of items to be purchased and the inventory adjustment suggestions; analyzing at least a portion of the received data to determine a break-even point and to predicting a dynamic point of reorder; receiving a food order request; coordinating the preparation of food items in a food order in a food preparation area; generating a predicted food order ready time; coordinating the packaging of the food items in the food order; generating a predicted packaged food order ready time; receiving a reservation request; retrieving, responsive to the received reservation request, historical seating data from a database, the historical seating data comprising at least restaurant-specific history data; retrieving current seating data comprising information describing a plurality of patrons that are currently seated at tables in the restaurant; calculating a preliminary table turn-time estimate comprising an estimate of when a table will become available to satisfy the request for a reservation, wherein the preliminary table turn-time estimate is based at least in part on the historical seating data, the current seating data, and the request for a reservation; monitoring the current seating data for changes and produce an updated table turn-time estimate based on any changes as they occur; updating the stored seating data based on the current seating data and the request for a reservation; receiving a plurality of requests from client devices; decrypting received encrypted requests; designating at least one or more of the cluster of computing devices to receive at least one of the plurality of requests using a load balancing algorithm; and transmitting the at least one of the plurality of requests to the designated at least one or more cluster of computing devices for processing by a microservice stored and operating on one or more of the cluster of computing devices.

According to an embodiment, the system may further comprise a real-time staffing management microservice which: receive a staffing request; receive, responsive to the received staffing request, a plurality of stored and third-party data comprising financial, staff, and patron related information and use machine-learning to: analyze at least a portion of the received data to determine real-time staffing requirements and to predict future staffing requirements; generate an optimized schedule based on the on the determined real-time staffing requirements; and generate an staff adjustments based on the determine real-time staffing requirements and the predicted future staffing requirements.

According to an embodiment, the system may further comprise an optimized routing for food delivery microservice which: receive a routing request; receive, responsive to the received routing request, a plurality of stored and third-party data comprising, financial, staff, patron, food preparation, location, map, and menu related information and use machine-learning to: coordinate the delivery of the food order to the food order delivery destination; generate an optimal food delivery route; and generate a predicted food order delivery time.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
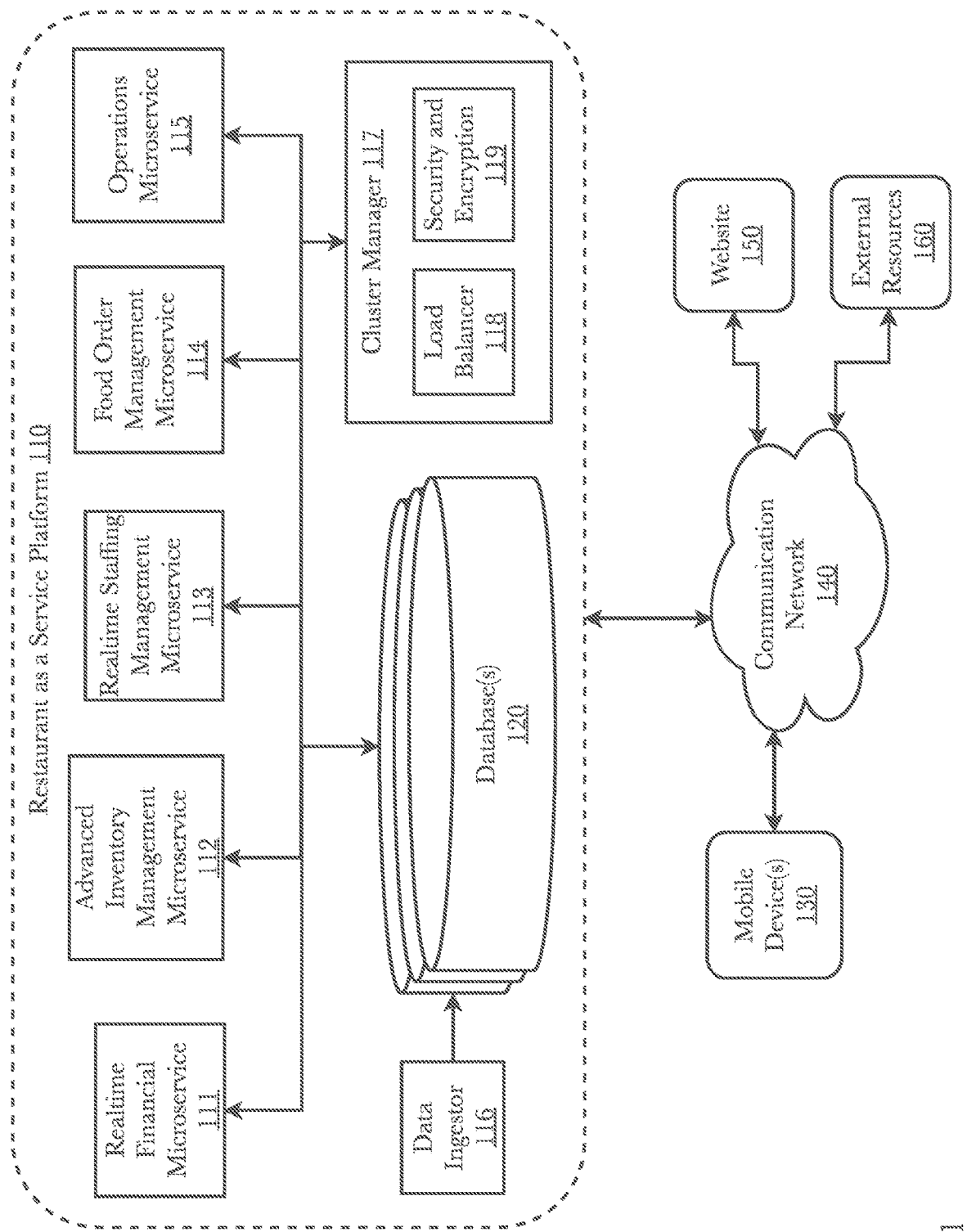
FIG. 1 is a block diagram illustrating an exemplary system architecture for a restaurant-as-a-service system, according to a preferred embodiment.

The inventor has conceived, and reduced to practice, a system and method for a restaurant-as-a-service (RaaS) system, comprising one or more database(s), a cluster manager, and a platform which provides restaurants automated, multiple-domain spanning, intelligent business predictions and optimizations leveraging modular, highly integrable microsystems which perform various domain-specific functions and tasks to enhance restaurant operations and patron experience. The cluster manager may intercept data requests and algorithmically forward requests to the appropriate microservice operating on an available cluster of computing devices.

The RaaS system provides business scale predictions, optimizations, and potential solutions leveraging an ever growing database full of rich data and machine learned algorithms, including deep learning, while taking advantage of a distributed cloud-based architecture. When operating at a restaurant, all data and money passes through the system allowing the system to manage day-to-day operations in real-time and coordinate long-term restaurant optimization strategies across a variety of restaurant domains. For example, restaurant domains may comprise the patron experience, employees, food preparation, food delivery, inventory and supply chain, and finance. Each domain may comprise subdomains providing for varying levels of granularity within a domain which may be selected by a system user to narrow, broaden, or otherwise customize the scope of the system's operations.

The RaaS system is built upon a massive dataset constructed from information collected from a large plurality of restaurants and the patrons of those restaurants. An aspect of the system may include a software application (App) that restaurant patrons and employees may download on to their mobile devices (e.g., cell phone, tablet, laptop, e-reader, smart wearables, etc.). The App may present a different visual and user experience depending on the type or role of the user (e.g., a patron, a restaurant employee, a merchant, etc.). A system and App user may be able to choose his or her current reason for accessing the App such as, for example, via text by typing the reason and submitting to the App, by speaking into the device microphone, and by selecting from a list or display of options (e.g., patron, employee, manager, merchant, supplier, etc.). For example, a system user logs into the App and selects from a dropdown list the reason for her visit is as a patron and responsive to her selection, the App directs the user to a patron page where the user may be able to perform a plurality of actions such as creating or editing her patron profile, place a food order, make a reservation or add name to a waitlist, track a food order, and explore system connected restaurants and menus, to name a few possible actions.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Business establishment" or "place of business" as used herein mean the location of any business entity with which customers may transact business. Typically, this will be a physical location where customers may enter the location and transact business directly with employees of the business, however, it may also be a delivery-based business. Many examples herein use a restaurant as the business establishment, but the invention is not limited to use in restaurants, and is applicable to any business establishment. "Patron" is used to reference the customer or prospective customer of the business establishment. "Staff" is used to reference the employee or contractor of the business establishment.

Conceptual Architecture

FIG. 1 is a block diagram illustrating an exemplary system architecture 100 for a restaurant-as-a-service (RaaS) system, according to a preferred embodiment. According to an embodiment, the system 100 may comprise a RaaS platform 110, one or more of a plurality of microservices 111, 112, 113, 114, 115, a data ingestor 116, a cluster manager 117, and one or more database(s) 120. RaaS platform 110 may comprise one or more computing devices each of which having their own non-volatile storage device and at least one or more processor(s) for processing computer instructions. For example, RaaS platform 110 could be operated at a datacenter or distributed across multiple (i.e., a cluster) computing devices in physically (e.g., geographically) different locations. Microservices 111, 112, 113, 114, 115 may leverage one or more machine and deep learning algorithms to process and analyze the massive amount of information stored in database(s) 120 to produce as outputs various domain (microservice) specific optimizations and predictions. While each microservice 111, 112, 113, 114, 115 is responsible for generating domain specific outputs, the one or more machine and deep learning algorithms operating within a microservice take into account all available data and processes generated or utilized by other microservices operating on RaaS platform 110. In this way, system 100 can generate microservice specific outputs that account for global state and context data. According to an embodiment, the system 100 may further comprise one or more of a plurality of mobile device(s) 130 (e.g., cell phones, tablets, e-readers, laptops, smart wearables, internet-of-things (IoT) devices, etc.) and one or more website 150 or webapp. Mobile device(s) 130 and website 150 may connect to RaaS platform 110 via a communication network 140.

Data received, retrieved, or otherwise obtained by system 100 may be pre-processed by RaaS platform 110 via data ingestor 116, according to an embodiment. Data ingestor 116 may comprise one or more data gathering means such as, for example, a web crawler for scraping data from $3^{rd}$ party websites, databases, and other external resources 160, a data connection module that utilizes application programming interfaces (APIs) to gather data. In some embodiments, data ingestor 116 may comprise at least one or more data portals, or receive data from at least one or more data portals, wherein the data portals allow various system actors (e.g., patrons, servers, restaurants, distributors, banks, etc.) to directly upload data to RaaS platform 110 via communication network 140 from a plurality of system connected devices and sources.

Additionally, data ingestor 116 may comprise one or more data pre-processing pipelines utilized to transform received data into suitable format(s) for data storage, machine and deep learned model training, machine and deep learned model testing, and various other uses. Data pre-processing actions, tasks, and transformations may include, but are not limited to, data cleaning, data pruning, data parsing, data normalization, data tagging, data anonymization, instance selection, optical character recognition, feature extraction and selection, and data reduction. In this way, data ingestor 116 may perform an initial data quality assessment on ingested data resulting in more useful training sets for the one or more machine and deep learned algorithms constructed and implemented by system 100 and operating on RaaS platform 110. Pre-processed data may be persisted to database(s) 120 for future use, and/or may be sent to one or more microservices operating on platform 110 for domain (microservice) specific processing actions. Additionally, in some aspects and instances received raw data (e.g., data that has not be been pre-processed by ingestor 116) may be stored in database(s) 120, and/or a cache (not pictured) may also be used to temporarily store a plurality of data, such as received raw data.

In some embodiments, data ingestor 116 may further comprise a speech recognition engine, or components thereof, for ingesting and processing voice data. Components such as signal processors (e.g., waveform analysis, fast-Fourier transform, etc.), part-of-speech taggers, speech-to-text, lexicon and vocabulary datasets, and other natural language processing components and processes may be implemented within data ingestor 116 or implemented separately, but operating in parallel with data ingestor 116.

According to an embodiment, the cluster manager 117 may be configured to act as an intermediary acting on behalf of platform 110 which decouples the system 100 frontend from the backend microservices 111, 112, 113, 114, 115 and filters all incoming and outgoing traffic. The decoupling of front-end and back-end services allows for changes to be made to backend microservices without disrupting the front-tend experience. The filtering of incoming and outgoing traffic allows for monitoring, basic forms of security and encryption, request routing, load balancing, caching, and protocol translation. Cluster manager 117 may be considered, or act as a proxy server between system 100 users and the various microservices offered via platform 110. Cluster manager 117 may perform load balancing 118 to efficiently distribute incoming network traffic across one or more clusters of backend microservices. When operating, system 100 could serve hundreds of thousands of concurrent requests from users (e.g., venues, patrons, employees, food delivery drivers, food distributors, etc.), and do so in a fast and reliable manner. Cluster manager 117, via load balancer 118, acts as a "traffic cop" sitting in front of system servers (microservices) and routing user (e.g., client) requests across all servers capable of fulfilling those requests in a manner that maximizes speed and capacity utilization and ensures that no one server is overworked which could degrade performance. If a single server goes down, the load balancer 118 redirects traffic to the remaining online servers. When a new server is added to the server cluster, the load balancer 118 automatically starts to send requests to it. Cluster manager 117 may utilize one or more load balancing algorithms known in the art. For example, load balancing algorithms may include, but are not limited to, round robin which distributes requests across the cluster of servers sequentially, least connections which sends new requests to the server cluster with the fewest current connections to clients, hash, IP hash, and various others.

According to an embodiment, cluster manager 117 may receive a plurality of requests from various client devices such as patron and restaurant mobile devices 130, a restaurant computer via website/webapp 150, and from POS devices, to name a few. The requests may take the form of a plurality of data requests made by the client to platform 110 and one or more of the microservices provided by platform 110. For example, financial action requests may be made and sent to real-time financial microservice 111, an inventory request may be made and sent to advanced inventory management microservice 112, a staffing request may be made and sent to real-time staffing management microservice 113, a food order request may be made and sent to food order management microservice 114, and a reservation request may be made and sent to operations management microservice 115. These requests are used for exemplary purposes only, and do not reflect all possible requests that may be received by cluster manager 117 or any of the microservices. Cluster manager 117 may determine which microservice and which cluster of computing devices is the most appropriate for processing of the received requests, such as through a round robin load balancing algorithm.

Cluster manager 117 may provide session persistence via load balancer 118. Information about a user's session is often stored locally in the browser or application. For example, in an online food order application the items in the user's food order might be stored at the browser level until the user is ready to purchase the food. Changing which server or cluster of servers receives requests from that client in the middle of the food ordering session can cause performance issues or outright transaction failure. In such cases, it is essential that all requests from a client are sent to the same server or cluster of servers for the duration of the session. Load balancer 118 may handle session persistence as needed. For example, an upstream server may store information requested by a user in its cache to boost performance.

According to an embodiment, cluster manager 117 may provide security and encryption 119 functions either directly or indirectly. The off-loading function of load balancer 118 defends a business enterprise against distributed denial-of-service (DDoS) attacks. It does this by shifting attack traffic from the business enterprise server to a public cloud provider. DDoS attacks represent a large portion of cybercrime as their number and size continue to rise. Load balancer 118 with cloud offload provide efficient and cost-effective protection. Secure Sockets Layer (SSL) is a standard security technology for establishing an encrypted link between a web server and a browser or application. SSL traffic may be decrypted via load balancer 118. When load balancer 118 decrypts traffic before passing the request on, it is called SSL termination. Load balancer 118 may save the web servers from having to expend the extra CPU cycles required for decryption, which can improve system 100 performance. However, SSL termination may lead to a security concern because the traffic between the load balancer 118 and the cluster of servers is no longer encrypted. However, this risk can be lessened when the cluster manager 117 is within the same data center as the cluster of servers. According to an embodiment, load balancer 118 may implement SSL pass-through. In this scenario load balancer 118 merely passes an encrypted request to the cluster of servers. Then the cluster of servers does the encryption. This method may be used for business enterprises that require extra security.

According to an embodiment, system 100 may be designed as a representational state transfer (REST) architectural style which uses a subset of hypertext transfer protocol (HTTP) to facilitate interactions between end-user devices and platform 110 and its various microservices. Using this architecture, clients and platform 110 may interact via REST application programming interfaces (APIs) using a stateless protocol and a predefined set of operations. In this type of architecture, cluster manager 117 may be considered an API gateway which routes requests from mobile App and website/webapp APIs to various microservices supported by platform 110.

Some of the data collected and processed by system 100 may be personally identifiable information (PII) or other types of information a system user may wish to keep private. For example, financial data such as bank account and bank card information, mortgage and/or rental agreement information, an account password, and others. According to an embodiment, platform 110 may encrypt this type of data and ensure that this type of data is being stored and processed in accordance with guidelines established through various data protection regulations and laws such as the California Consumer Privacy Act (CCPA) and the European Union's General Data Protection Regulation (GDPR). Additionally, system security may include the use of two-factor authentication (2FA) to verify the identity of system user during system login or to verify a financial transaction such as a patron paying a dinner bill using his or her mobile device. A plurality of 2FA methods may be implemented by various embodiments of system 100, for example, 2FA may be implemented using additional login credentials only the system user (account holder) should know such as security question answers and PIN numbers, by using devices the account holder owns that receive additional login credentials such as a security token, mobile device app, or tablet device app, and by using biometric login credentials unique to the system user (account owner) such as retina scans, fingerprints, facial scans, and voice data. The choice of 2FA implementation may depend on the embodiment of the system, and on the use case of the particular restaurant or business enterprise which uses system 100.

According to an embodiment, communication network 140 may comprise wired networks or wireless networks, or some combination of both wired and wireless. Communication network 140 may be comprised of, but is not limited to, cell phone network (e.g., code division multiple access [CDMA], global system of mobiles [GSM], 4GLTE, 5G, etc.), wireless network (e.g., WiFi, Bluetooth, wireless local area network [WLAN], etc.), and the internet (e.g., through a router or ethernet connection). For example, a restaurant manager's office may contain a desktop personal computer (PC) which connects to RaaS platform 110 by accessing website 150 or webapp via an internet connection established via an ethernet cable directly into the internet modem, while the point-of-sale (POS) device located in the restaurant front-of-house is connected to RaaS platform 110 via the restaurant's wireless network. Further connected to the restaurant's wireless network could be patron and server mobile devices 130 currently located in the restaurant. A restaurant will be used in the following specification for exemplary purposes, however, the RaaS system 100 may be utilized in a variety business establishments and industries (e.g., retail businesses, warehouse, zoos, etc.), and should not be considered limiting of the scope of the disclosed system.

According to an embodiment, mobile devices 130 may access RaaS platform 110 via website through an internet application on the device, and they may also access using a software application (App) stored on and operating on mobile device 130. According to an embodiment, a mobile device App may provide a front end experience for a system 100 user, and may comprise a user interface (UI) (e.g., graphic UI) which allows users to easily and seamlessly engage with system 100 in a plurality of ways that may be customizable to a specific user and even to one or more roles a specific user might possess, and one or more data portals establishing bi-lateral data exchange between mobile device 130 (or website 150), RaaS platform 110, and the one or more of a plurality of microservices 111, 112, 113, 114, 115 which may reside on platform 110. For example, restaurant patrons may use the mobile App to create a new or update an existing personal profile, to view, search, and discover system 100 connected restaurants, browse restaurant menus, order food, schedule reservations, check-in with a restaurant, review and receive user specific coupons and specials, and provide feedback (e.g., App related feedback, dining experience feedback, restaurant reviews, etc.), to name a few of the possible interactions.

According to an embodiment, website 150 may be constructed similarly to the mobile device App, in that website 150 may comprise one or more of a plurality of portals which connect the device (e.g., tablet, PC, POS device) accessing the website to one or more of a plurality of microservices 111, 112, 113, 114, 115 which may reside on platform 110, and a UI which may provide a system 100 front end user experience for navigating and interacting with the various microservices. The UI may be a graphic user interface (GUI) displayed on the display screen of a computing device connected to system 100 such as an LCD display, and the display screen may be a separate device than the computing device connected to server 100 such as PC with a computing "tower" housing all the computing hardware connected via HDMI to an external monitor.

According to an embodiment, one or more database(s) 120 may be present in RaaS platform 110. There are a plurality of data storage devices and techniques known to one skilled in the art, and any one of or combination of data storage devices and techniques may be utilized by system 100 according to the embodiment and specific implementation and application use case of system 100. For example, database(s) 120 may be stored on data storage devices such as, for example, hard disk drives (HDDs) and solid-state drives (SSDs). Database(s) 120 may comprise, but is not limited to, one or more of a relational database, centralized database, look-up tables, structured query language (SQL) database, NoSQL database, graph database, object-oriented database, wide column stores, and hierarchal databases. According to some embodiments, database(s) 120 may include $3^{rd}$ party public and private datasets obtained from public and private databases and other external resources 160 accessed via RaaS platform 110.

According to an embodiment, database(s) 120 may store a plurality of information related to various actors such as patrons, employees, restaurants, distributors, and banks. System 100 may obtain this information directly from system 100 users (e.g., patrons, restaurants and their employees) who create personal profiles with basic information such as name, address, phone number, email, and user specific preferences. Creation of a personal profile may be conducted on a mobile device App or a website/webapp when a system 100 user first downloads, visits, or otherwise interacts with the mobile App or website/webapp. In some embodiments, creation of a personal profile may be facilitated through a mobile device or POS device affiliated with the restaurant or one of its employees. System 100 may also receive, retrieve, gather, infer, learn, or otherwise obtain information indirectly about patrons, employees, restaurants, and distributors, by analyzing user interactions with the mobile App, the website/webapp, and patron, server, and restaurant interactions that happen in a typical dine-in experience. For example, a patron can manually enter into his or her profile preferences his or her preferred menu item for a given restaurant, or system 100 can analyze his or her dining history data (e.g., POS receipts, order frequency, etc.) stored in his or her profile to infer a preferred menu item for a given restaurant.

According to an embodiment, the information stored in database(s) 120 may include, but is not limited to, the following: patron profiles, server profiles, restaurant profiles, business data, inventory data, POS data for a plurality of sales transactions, account receivable information for a plurality of vendors (e.g., food and non-food distributors, lawn maintenance, linen service, etc.), accounts payable information for a plurality of banking institutions, time and location descriptors, a food item, a food amount, a food cost, a recipe, recipe substitutions, estimated preparation time, hours of operation, leasehold costs, tax and insurance costs, costs of goods sold, profit margins, salary costs, hourly wage costs, professional services costs, a food item previously purchased, local news and events, current and forecasted weather, a social media posting, and a rating or review relevant to each staff profile. According to an embodiment, inventory data may comprise at least one of: a quantity of an item on-hand, a par level, a last re-order data, an expiration date, a shelf life value, or a forecasted reorder date; real-time third-party data, the real-time third-party data comprising at least one of: local news and events, current and forecasted weather, a social media posting, or a rating or review; and stored patron data comprising at least one of: a food item previously purchased, day and time data, weather conditions, local news and events, or preferences.

According to an aspect, a restaurant may access website/webapp 150 to enter or update a variety of financial information that may include lease hold costs, loaded labor rates, cost of goods sold menu items, recipe information, inventory on-hand, staff, staffing needs, culinary skill requirements along with other information that may be stored in a database 120, and used by real-time financial microservice 111 that may offer or execute financial transactions to optimize business operations around one or more business metrics.

Similarly, according to an aspect, a restaurant may access website/webapp 150 to enter or update a variety of inventory information that may include current inventory on hand, re-order levels, expected usage and so on along with other information that may be stored in a database 120, and used by real-time inventory management microservice 112 that may offer or execute inventory related actions to optimize inventory operations around one or more business metrics. According to one aspect, POS devices may automatically update inventory information in real-time after the completion of a transaction.

Similarly, according to another aspect, a restaurant manager may access, via a restaurant computer, webapp/website 150 to enter or update a variety of operational information that may include staffing needs, training needs, hours of operations, upcoming market events and so on along with other information that may be stored in a database 120, and used by real-time staffing management system 113 that may offer or execute staffing actions to optimize business operations around one or more staffing metrics. Other such real-time information and factors may also be determined by system through access to one or more external resources 160 such as a utility provider that may include current usage, current rates, balance due and so forth. Other exemplary external resources 160 may comprise public data services or sources such as weather service, social media platforms, news outlets and rating services.

Likewise, vendors may access website/webapp 150 to enter information about service or product provided, invoice information, credit terms and any current or upcoming promotions along with other information. Examples of the types of information that a vendor may enter include, but are not limited to: restaurant name, location, types of food item provided (e.g. rice, beans, wagyu beef, scallions, grass fed young chickens, chicken liver pate, cod liver oil), type of non-food item provided (e.g. 12 oz paper cups, 9 inch paper dinner plate, bleach, lemon wax, rubbing alcohol) service offered (e.g. uniform service, landscaping maintenance), item pricing, credit terms, special pricing options like volume discounting daily specials or seasonal offerings. In some aspects, the system may be able to determine certain information by accessing external resources 160 such as mapping websites and applications. For example, system may access a publicly-available mapping website such as Google maps, which may contain information about the restaurant's name, location, types of food offered, hours of operation, phone number, etc. Thus, in some aspects, it is not necessary for the restaurant to enter certain information through portal, as the information may be automatically obtained from external resources 160.

In an aspect, when a staff mobile device 130 connects to RaaS platform 110 and requests a microloan, real-time financial microservice 111 queries database 120 for the risk profile of staff, current cash profile of the restaurant and compares with loan request and offers a loan and associated terms. The staff may decide to accept or decline loan term offers through the staff mobile device 130. Similarly, staff may access staff mobile device 130 and request scheduling information or updates from the real-time staffing management system 113.

In some aspects, real-time staffing management microservice 113, through staff mobile device 130, may also provide information to the staff of schedule modifications or upcoming staffing needs which the staff may accept or decline. If the restaurant has entered information such as incentive pay, real-time staffing management microservice 113 may use that information to offer the restaurant staff additional monetary or other incentives (e.g. future vacation day with pay) to accept a shift schedule that is sorely needed to be filled. Such incentives may be adjusted for busy periods at the restaurant (typically around lunch and dinner) either automatically based on the restaurant's history as stored in a database(s) 120, or by retrieving information stored in a database(s) 120 that has been manually entered by the restaurant through website/webapp 150 or restaurant mobile device 130.

According to an embodiment, a system 100 user's social media data may be received, retrieved, or otherwise obtained, wherein the social media data may be stored in database(s) 120 and processed by RaaS platform 110. For example, a patron could have stored on his or her mobile device 130 a system 100 connected App and a social media application, and grant permission for the App to collect data about the patron's social media profile, such as likes and dislikes.

In some embodiments, profile information may include personal information such as financial data, for example, bank account or bank card information. For example, a patron may enter his debit card information into his personal account to facilitate and streamline online food ordering, and to allow for contactless payments when visiting the restaurant in person. As another example, a restaurant employee may enter her bank account information into her personal account to receive her paycheck from the restaurant, to except contactless tips from patrons, and to perform other financial transactions such as to receive and pay off micro-loans issued from the restaurant to her. According to an embodiment, restaurant employees may be able to enter information in their profiles about their finances and bills, such as monthly rent, utilities, insurance, telephone, etc., such that system 100 may be able to process this information with all other information it receives, through one or more machine learned algorithms, to generate optimizations and suggested actions responsive to the input information.

For example, platform 110 or at least one or more of its microservices 111, 112, 113, 114, 115 may process and analyze restaurant data to identify the most profitable sections, tables, shifts, days, and weeks of the restaurant, the employees daily wage plus potential tips, restaurant cash flow, and a plurality of profiles belonging to a employees of a restaurant to learn when the bills of the employees are due, and automatically generate optimized employee work schedules. These work schedules may be optimized to ensure that each employee will be scheduled for enough shifts within the proper time frame (e.g., two weeks, one month, three days, etc.) such that the employees will have earned enough income to cover their expenses, as well as optimized to maximize restaurant cash flow. Continuing the example, separate from or in addition to generating optimized employee schedules, platform 110 may also generate suggested micro-loans that the restaurant may offer to an employee, based upon the gathered and analyzed data such as the ability for the employee to honor the payment. Furthermore, according to an embodiment, platform 110 may be configured to give micro-loans to system 100 connected merchants taking into account the merchant's financial data and the ability of the merchant to honor the loan. Another outcome of the preceding example could be an advancement of certain employees payroll, taking into account the cash flow of the restaurant and the monetary needs of the employees.

According to an embodiment, system 100 may comprise one or more of a plurality of microservices 111, 112, 113, 114, 115 stored on and operating on RaaS platform 110. Microservices may be stored as a plurality of machine readable instructions on a non-transitory storage device of, and executable on one or more processors of, a computing device, which may be grouped in a cluster of computing devices. Each microservice may be configured to a particular aspect (domain) of business operations such as financial management microservice 111, advanced inventory management microservice 112, real-time staffing management microservice 113, food order management microservice 114, and operations management microservice 115. These microservices 111, 112, 113, 114, 115 are shown for exemplary purposes and do not represent the full extent of the types of microservices that may exist and may be included in various embodiments of system 100. Each of the microservices 111, 112, 113, 114, 115 may store data in and retrieve data from database(s) 120. Each of the microservices 111, 112, 113, 114, 115 may receive data from, and send data to, mobile device(s) 130, website/webapp 150, and external resources 160. Furthermore, each of the microservices 111, 112, 113, 114, 115 may exchange data (e.g., machine and deep learned algorithm inputs and outputs) between and among each other.

According to some embodiments, microservices 111, 112, 113, 114, 115 may each be used independently and separately from one another. However, system 100 may be continuously testing, training, and updating at least one of a plurality of machine and deep learned algorithms using datasets constructed from at least a subset of data received from, for example, mobile devices 130, website/webapp 150, and external resources 160, and other data stored in database(s) 120. A cloud-based architecture enables system 100 to publish algorithm and/or model updates with less overall system downtime. According to some embodiments, platform 110 may utilize one or more machine and deep learned algorithms to determine update publishing schedules using a plurality of data such as, for example, system usage metrics, server health and load metrics, update size data, and financial impact analysis data (e.g., how much revenue is lost due to system downtime). Each microservice 111, 112, 113, 114, 115, whether operating independently or in some combination, still gains the benefit of being trained using a massive amount of global data collected from a plurality of devices and sources.

Although microservice 111, 112, 113, 114, 115 may be used separately, business establishments, such as restaurants, may receive a most optimal and enhanced experience when all microservices 111, 112, 113, 114, 115 are operating and used simultaneously. Utilizing multiple microservices, system 100 may learn and adapt its systems and processes to a given restaurant's operations and rules, across multiple domains. This may allow system 100 to synchronize data flow and processes across multiple microservices representing multiple facets of a restaurant's business operations.

According to an embodiment, system 100 may continuously learn about global trends and optimizations, and about restaurant-specific local trends and optimizations. Global trends may be learned, predicted, and inferred by the one or more machine and deep learned algorithms using datasets constructed from global data, wherein global data is data gathered from multiple sources, such as a dataset of monthly revenue collected and aggregated from at least two or more business establishments' financial data. According to an embodiment, system 100 may construct datasets from a particular subset of data stored on database(s) 120 and/or obtained from a particular subset of system connected devices. For example, a dataset may be constructed from restaurants that all serve the same type of food (e.g., Italian, Mexican, Indian, Moroccan, etc.), a dataset may be constructed from restaurants located within a geographic location (e.g., all restaurants in a city, in a neighborhood, on a single block, etc.), or a dataset may be constructed from restaurants that share a common $3^{rd}$ party connection (e.g., all restaurants that share a common food distributor, all restaurants that share a common utility service, restaurants that share linen service, etc.), among numerous other possibilities. As a result, restaurants may benefit from system 100 generated restaurant-specific suggestions and optimizations, further contextualized with global and/or targeted trends and data.

According to an embodiment, restaurant-specific trends and optimizations may be learned, predicted, inferred, or otherwise generated by the one or more machine and deep learned algorithms using datasets constructed from data collected from or associated with a single restaurant. In most use cases, a restaurant, or other business establishment, will begin using system 100 to help manage day-to-day and long term restaurant operations by leveraging machine and deep learned algorithms initially trained on global data and global trends, but the system 100 quickly adapts the global models to meet the specific needs of the restaurant as more restaurant-specific data is collected and processed by RaaS platform 110.

According to an embodiment, real-time financial microservice 111 may directly be used to process all financial data associated with a restaurant such as POS data, accounts payable data, and accounts receivable data, as well as provide credit card payment facilitation. The one or more machine or deep learned algorithms utilized by real-time financial management microservice 111 may process the received financial data, as well as other data collected by system 100 to autonomously manage the financial health of the restaurant. For example, a restaurant has to pay its payroll and microservice 111 can automatically advance the payroll and deduct fees on a daily basis from the restaurant taking into account, for example, profitability and restaurant cash flow. Realtime financial management microservice 111 may also be utilized to determine and plan for capital investments. For example, microservice 111 may analyze a plurality of factors such as initial cost, current maintenance expenditures, projected future maintenance expenditures, projected energy savings, and potential food savings to determine that the purchase of a new, larger refrigerator will result in an increased profitability by reducing food waste and allowing for certain foods to be bought and stored in larger quantities resulting in lower wholesale costs from food suppliers. Each day microservice 111 could set aside a portion of revenue towards a refrigerator fund and when the fund has enough money to make the purchase, system 100 can automatically execute the purchase, with or without managerial approval.

Realtime financial management microservice 111 may work in conjunction with other microservices, such as advanced inventory management microservice 112. Advanced inventory management microservice 112 may be used to generate smart shopping lists of food items and supplies to be purchased from a plurality of distributors and vendors. The minute the restaurant orders supplies, suppliers are automatically paid immediately. As an example, a restaurant may receive financing over a period of time from a supplier for various inventory, and every time the restaurant sells a plate, a small amount could be deducted for payment for the inventory. Microservice 111 may create a reserve buildup that is based on expected non-mitigable losses, and optimizes spending for the restaurant. In this way, system connected restaurants need not care about keeping working capital, system 100 can function as the working capital.

Microservices 111, 112, 113, 114, 115 may be operated singly or in some combination by platform 110. System users (e.g., restaurants) may select which microservices 112, 113, 114, 115 they want to utilize, allowing users to customize which business (restaurant) domains system 100 is aware of and can optimize for. This modular architecture of the microservices allows business enterprises to seamlessly add or remove microservices to a business-specific system 100 configuration as the business owner or manger sees fit. According to some embodiments, system 100 and microservices 111, 112, 113, 114, 115 may be accessible via a subscription-based model where a business establishment may select microservices to subscribe to à la carte and pay on a predetermined schedule (e.g., monthly subscription fee). In this way, system 100 may be considered a restaurant-as-a-service system which provides restaurants automated, multiple-domain spanning, intelligent business predictions and optimizations leveraging modular, highly integrable microservices which perform various domain-specific functions and tasks to enhance restaurant operations and patron experience.

Figure 2:
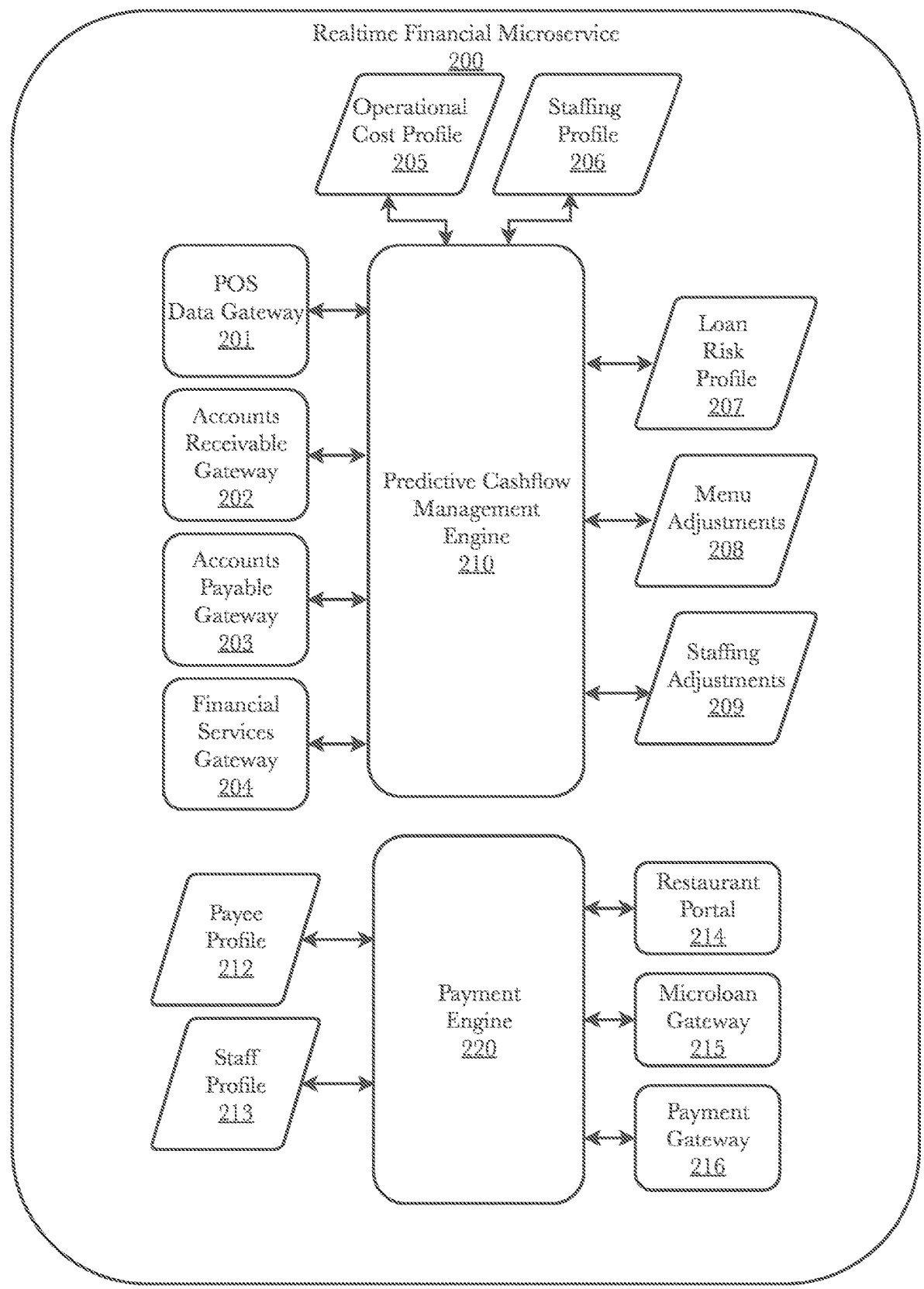
FIG. 2 is block diagram illustrating an exemplary system architecture for an aspect of the restaurant-as-a-service system, a real-time financial microservice.

FIG. 2 is block diagram illustrating an exemplary system architecture for an aspect of the restaurant-as-a-service system 100, a real-time financial microservice 200. According to an aspect, a real-time financial microservice 200 comprises several microservices including a predictive cash flow management engine 210 and a payment engine 220. A predictive cashflow management engine 210 may connect, for a bi-lateral data exchange (e.g., to receive financial action requests from other microsystems and/or system 100 actors), between POS data gateway 201, accounts receivable gateway 202, account payable gateway 203, financial services gateway 204; may receive operational cost profile 205 and staffing profile 206; and may provide as outputs loan risk profile 207, menu adjustment 208, and staffing adjustment 209. A payment engine 220 may receive payee profile 212, staff profile 213; establish a bi-lateral data exchange with restaurant gateway 214, microloan gateway 215, and payment gateway 216.

According to an aspect, when a restaurant desires to optimize their operations around a given parameter, for example to maximize profitability, predictive cashflow management engine 210 receives current menu offering from POS data gateway 201, current outstanding invoices from account receivable gateway 202, current outstanding accounts payable from accounts payable gateway 203, current banking balances from financial services gateway 204, operational cost profile 205, staffing profile 206. Input dataset, via data ingestor 116, may be cleansed and formatted using machine learning or other techniques known to those skilled in the art. For example, a predictive cashflow engine may use dimension gradient optimization technique to maximize a profitability function. The predictive cashflow management engine may provide a corresponding set of instructions for menu adjustments 208, staffing adjustments 209, and makes updated proposals to suppliers through accounts payable gateway 203 to maximize profitability around a given set of parameters.

In some aspects, real-time financial microservice 200 may have a payment subsystem in which a payment engine 220 makes a loan to a restaurant staff or other restaurant partner through a microloan gateway 215 based upon information received from the loan risk profile 207 via the predictive cashflow management engine 210. Loan risk profile 207 may be determined by machine and deep learning algorithms such as elastic net, random forest, neural networks, or gradient boosting models or other approaches known to those skilled in the art. Payment engine 220 may also provide payment facilitation capabilities which processes financial interactions (e.g., a credit or bank card transaction, dinner payment, etc.) via a payment gateway 216 or via POS data gateway. Financial interactions may include, but are not limited to, payroll processing, POS transactions, inventory purchases, and capital investments such as venue renovations or purchasing new equipment.

Note that this example is simplified for clarity, and that real-time financial microservice 200 will address a much broader set of factors and variables, as described elsewhere herein. The predictive cashflow management engine 210 may use any number of optimization algorithms, including machine and deep learning algorithms or others known in the art, to find optimal solutions to the large number of variables presented.

Figure 3:
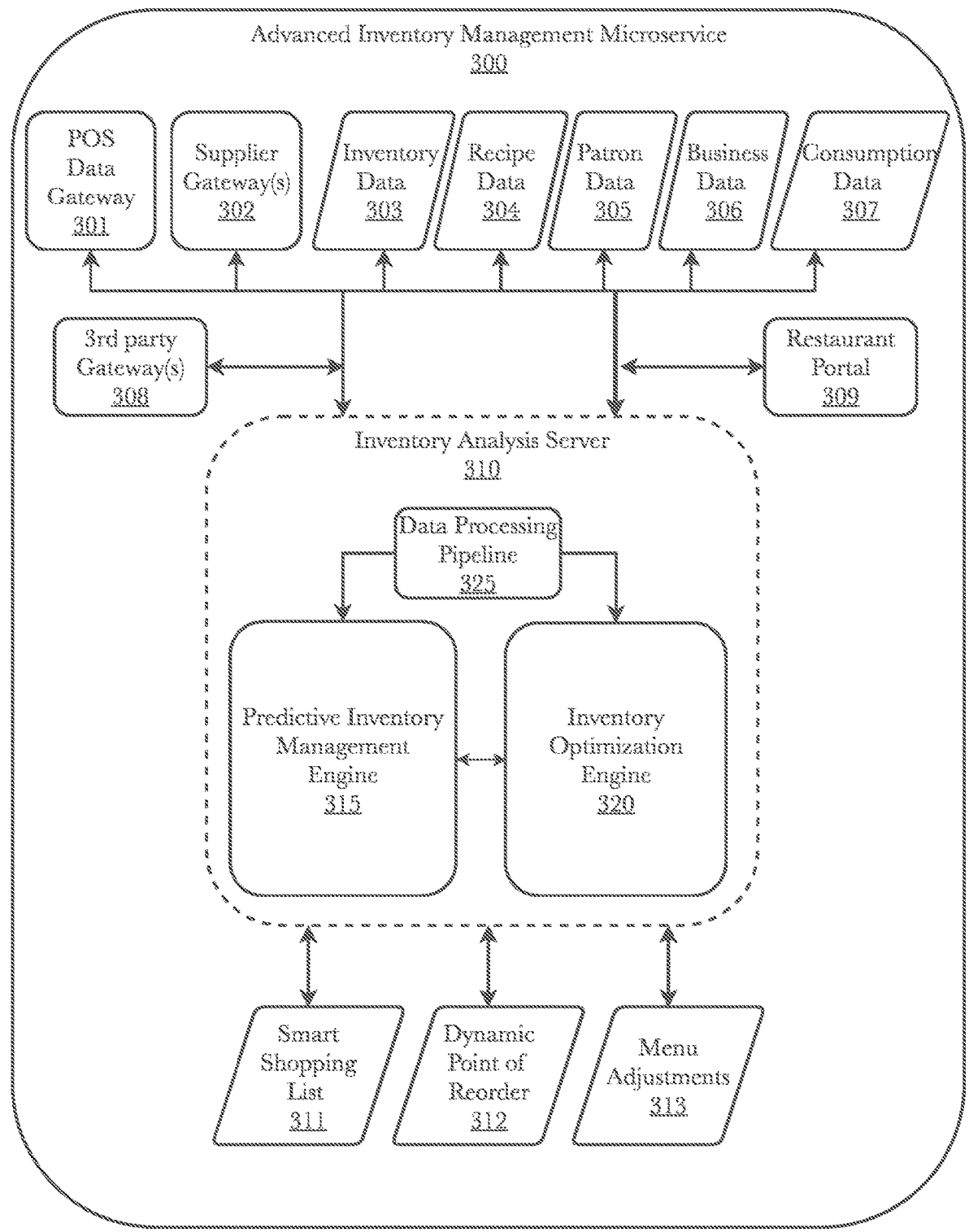
FIG. 3 is block diagram illustrating an exemplary system architecture for an aspect of the restaurant-as-a-service system, an advanced inventory management microservice.

FIG. 3 is block diagram illustrating an exemplary system architecture for an aspect of the restaurant-as-a-service system 100, an advanced inventory management microservice 300. According to an embodiment, advanced inventory management microservice 300 comprises an inventory analysis server 310 which may further comprise a predictive inventory management engine 315, an inventory optimization engine 320, and a data processing pipeline 325. The predictive inventory management engine 315 and the inventory optimization engine 320 may comprise one or more machine and deep learned algorithms. Inventory analysis server 310 may connect, for bi-lateral data exchange, to a point-of-sale ("POS") data gateway 301, a supplier gateway 302; may receive inventory data 303, recipe data 304, patron data 305, business data 306 and consumption data 307; establish a bi-lateral data exchange with a $3^{rd}$ party gateway 307 and restaurant portal 308; and may provide as outputs a smart shopping list 311, dynamic point of reorder recommendations 312, and menu adjustments 313.

POS data gateway 301 may be used to integrate with POS devices utilized by a restaurant to provide to advanced inventory management microservice 300 sales data which can be used by the inventory analysis server 310 to track and determine current inventory levels related to sold menu items. Distributor gateway(s) 302 may be used to integrate with a plurality of suppliers to access supplier data including, but not limited to, available items for purchase, quantity of items, cost of items, volume/bulk pricing scheme, seasonal items, delivery and payment characteristics (e.g., cash only, net seven or net fifteen, payment on delivery, delivery schedule, etc.), and lead times on certain items. In addition, supplier gateway(s) 302 may be used to send a smart shopping lists 311 and reorders to suppliers.

Third-party gateway(s) 308 may provide a plurality of information related to external demand factors such as (but not limited to) weather, social media, current events both locally (e.g., sporting event happening, farmers market, harvest information for local farms, publications in newspaper or magazine, local news feature, etc.) and non-locally (e.g., trade agreements that may affect inventory items, new rules or regulations that may impact business such as COVID-19 restrictions, catastrophic event, etc.). Third-party gateway(s) 308 may include APIs and web scrapers to retrieve (e.g., collect, query, aggregate, or otherwise obtain) data from various third-party systems, sources, and databases. For example, a web scraper may be used to scan social media feeds to identify and retrieve information related to a restaurant (e.g., reviews, likes, mentions, hashtags, links, shares, pictures, etc.) and store the information in database(s) 120. Then the advanced inventory management microservice 300 may perform sentiment analysis on the scraped social media information to provide more context about a restaurant's operations. According to an embodiment, sentiment data may be sent with all other data to inventory analysis server 310 to generate inventory related predictions and optimizations.

According to an embodiment, restaurant portal 309 may provide an interface where restaurant staff (i.e., manager) can view and interact with the outputs of the advanced inventory management microservice 300. For example, the microservice generates a smart shopping list 311 for each day of a given week and sends the shopping list to the restaurant portal where it may be reviewed by a manger before being sent to a supplier. In this way, restaurant portal 309 allows for managerial discretion and final say on all microservice outputs. Any changes made by a manger to the generated smart shopping list 311 may be captured by the advanced inventory management microservice 300 to provide more context feedback data for the inventory analysis server 310 to improve upon the machine learning (ML) algorithms that generate the smart shopping list 311. Additionally, the restaurant portal 309 may also be utilized by a restaurant to provide information related to inventory, staffing, and finances.

According to an embodiment, inventory analysis server 310 may receive a plurality of data including, but not limited to: external data such as weather, current and special events, and social media, supplier data, inventory data 303, recipe data 304, patron data 305, consumption data 307, and business data 306, such as, for example financial data related to marginal cash flow and payroll timing to name a few. Restaurant inventory data 303 may include, but is not limited to, current inventory, quantity of inventory items, purchase price of inventory items, purchase and delivery date, expiration date or shelf life of item, etc. Recipe data 304 may include, but is not limited to, an ingredient list, a time to prepare (e.g., ten minutes, forty-five minutes, etc.), ingredient substitutions (e.g., lasagna may be made to include meat or vegetables), and recipe yield (e.g., tomato sauce yields enough sauce for fifty dishes, twelve baguettes, etc.). Patron data 305 may include, but is not limited to, name, order or purchase history, address, phone number, comments, requests, reviews, reservation information such as, for example party size and time of reservation, preferences, and other information.

Patron data 305 may be collected from a restaurant computer accessing website/webapp 150, POS data gateway 301, and patron mobile device 130, and may be stored in database 120.

In an embodiment, patron data 305 may be collected from a mobile device 130 application associated with system 100 that facilitates a patron to order food from, make reservations at, leave reviews for, or post on social media about the restaurant, among various other things. Additional patron data 305 may be collected from social media or inferred from the analysis of social media data via machine learned algorithms. For example, a patron may make a post on social media, such as INSTAGRAM™, about a menu item they just ate at a restaurant, the post could include a picture of the dish, one or more hashtags, and a comment about the food. In this example, the advanced inventory management microservice 300 may access social media platforms using an API and then retrieve the data and metadata (e.g., time of post, location, etc.) associated with the social media post. For example, a patron makes a social media post containing a picture of a dish that was eaten along with a comment including one or more hashtags (e.g., #RESTAURANT-NAME, #DELICIOUS, #SOGOOD, #OVERRATED, etc.) and the advanced inventory management microservice 300 can determine the sentiment of the patron in regards to the dish or restaurant using the comment and hashtags as input into machine learned algorithms such as a natural language processing ("NLP") neural network. In some embodiments, a patron profile may be created and stored in database 120 to collate all data related to a given patron.

Consumption data 307 may be collected or derived from POS data gateway(s) 301, patron data 305, business data 306, and external sources 160, among others. Consumption data 307 may be used by the advanced inventory management microservice 300 to determine consumption patterns across a large plurality of metrics such as, for example consumption patterns based upon the time of day or weather. As an example of derived consumption data 307, the inventory analysis server 310 may determine that patron consumption has a ten percent decrease on rainy days, whereas patron consumption increases by ten percent on days when the local football team plays a game. Consumption data 307 may be utilized by the inventory analysis server 310 to determine a dynamic point of reorder 312 for a particular menu or inventory item, and may also be used when making menu adjustments.

According to an embodiment, inventory analysis server 310 may collect, parse, and clean a large plurality of data via a data processing pipeline 325, extracting and receiving data from at least one of the following sources selected from the non-limiting list of: the database 120, POS data, supplier data 302, inventory data 303, recipe data 304, patron data 305, business data 306, consumption data 307, and external and third-party data. Once the large plurality of data is preprocessed, it may be sent for ingestion into one or more machine learning algorithms located within the predictive inventory management engine 315 and inventory optimization engine 320. Various exemplary algorithms are described herein but are not limited to only those disclosed.

According to an embodiment, advanced inventory management microservice 300 may generate smart shopping list 311, dynamic point of reorder 312, and menu adjustments 313 as outputs of the microservice. These outputs may be sent to a restaurant portal 309 so that restaurant staff (i.e., manager) may view and interact with the outputs via an interface using restaurant mobile device 130, restaurant computer via website/webapp 150, or any other suitable computing device connected to the system. The interface may be a graphical user interface, or any other suitable interface known in the arts. The restaurant manager can view the outputs for final approval or, if necessary, revision. The manager may choose to either manually execute the output suggestions (e.g., email smart shopping list 311 or reorder request to appropriate supplier, make menu adjustments, etc.) or to have advanced inventory management microservice 300 execute the output suggestions automatically upon manger approval or revision. For example, a manager may view on a restaurant computer vis website/webapp 150 a smart shopping list 311 and a suggested menu adjustment 313 wherein the manager decides to manually email the smart shopping list to the supplier, but allows the advanced inventory management microservice 300 to automatically execute the menu adjustment 313. In some embodiments, the advanced inventory management microservice 300 may be configured to execute output suggestions without waiting for managerial approval, this may be applied on a per output basis (e.g., only allow execution of reorders without approval).

According to an embodiment, advanced inventory management microservice 300 may generate, via various machine and deep learned algorithms, smart shopping list 311 which may be determined and optimized around one or more business metrics. Every time restaurant staff access the smart shopping list 311, it is automatically updated with suggested quantities for each item and suggested supplier from which to purchase the listed items. The system is designed to take a holistic approach to generating suggestions for a list, not merely which supplier has the cheapest cost items (although profitability and financial viability may be among the variables included for generating suggestions). A smart shopping list 311 may generated per supplier, but optimized between suppliers. For example, a shopping list for a first supplier is generated for tomorrow and it determines to buy one third of the needed tomato sauce tomorrow, and to buy the rest from a second supplier in three days, in order to optimize the cash flow of the restaurant.

According to an embodiment, advanced inventory management microservice 300 may determine a dynamic point of reorder 312 for certain prepared items on the menu. The point of reorder is the point below normal inventory levels when a new batch of something should be reordered or prepared. The dynamic point of reorder 312 may be based on the following, but is not limited to, the time of week or day, minimum batch size, shelf life of food item, inventory data, time to produce food item, consumption data, weather, and special external factors such as holiday or trend days inferred from models. Pre-prepared items are ones the restaurant purchases from a supplier as they are and some are pre-prepared, but require some kind of preparation (e.g., making tomato sauce or a cake that arrives whole but needs to be cut into eight slices) before vending. For example, consider a bakery that pre-prepares the baguettes for a restaurant and each morning there is a standard set of items to start baking. The restaurant may receive the standard set of items from the bakery and then using the advanced inventory management microservice 300 it starts measuring what is happening during the day via the above described data components. As the microservice gathers statistics, it can also take into account the amount time it takes to produce the baguettes, what the consumption per hour is, the shelf life, and the break-even point in order to dynamically change the point of reorder. Continuing the example, the restaurant reaches a point of reorder an hour before it closes and it takes forty-five minutes to prepare a batch of baguettes which means it is not tenable to execute a reorder on the baguettes. Sometimes it may make sense to reorder a partial batch. For instance, the microservice may determine to reorder a partial batch at ninety minutes before close to ensure baguettes are available for late patrons. The target amount of reorder size adjusts during the evening so no waste occurs such that at five in the evening the point of reorder may be fifty baguettes, then at seven in the evening the point of reorder may be thirty baguettes, and so on. The dynamic point of reorder 312 can be approved or denied by the manager. The restaurant manager can send a request at any time to the prepare X amount items of Y from the bakery based upon the dynamic point of reorder 312.

According to an embodiment, advanced inventory management microservice 300 may generate menu adjustments 313 in order to optimize business operations according to one or more business metrics. For example, menu adjustments 313 may be determined and optimized based on profitability or freshness of ingredients. In some embodiments, the microservice may be able to view patron data associated with the weekend reservations in order to make menu adjustment based on patron purchase history. For example, the reservation list for Friday and Saturday night dinner service may include many revisiting patrons who have expressed (through comments to restaurant staff, or social media reviews and comments) that they enjoyed a particular pasta dish that was once offered as a special menu item. The microservice may, for that weekend, suggest adding the pasta dish to the menu as a weekend special in order to enhance the experience and sentiment of the patrons. Other menu adjustments may be made in response to inventory items nearing their expiration date or shelf life, or to take advantage of seasonal offerings.

Inventory analysis server 310 utilizes various ML and deep learned algorithms to perform a variety of actions to facilitate predictive inventory management and optimization tasks such as smart shopping list 311 generation, dynamic point of reorder 312, and menu adjustments 313. For example, an NLP neural network may be created to analyze and determine sentiment in regards to a restaurant and its menu items based upon ingested (non-limiting) social media data, website reviews, and media mentions such as newspaper or magazine articles and television news reports. Sentiment data may be used, in conjunction with a large plurality of various other data, as inputs into another ML algorithm to suggest inventory actions 311, 312, 313. According to one embodiment, the predictive inventory management engine 315 may implement one or more long short term memory (LSTM) neural network, which is a special recurrent neural network (RNN), to generate inventory based predictive and optimized outputs from the predictive inventory management engine 315 and the inventory optimization engine 320. LSTM neural networks are well suited to generate suggestions (i.e., predictions) in response to a large plurality of variables spanning a massive collection of heterogenous information. Particularly, the inclusion of memory in the LSTM neural network makes it useful for analyzing and optimizing time-series data due to its inherent ability to save previous states for long periods of time. Inventory management may be considered a time-series prediction and optimization task because, historically, inventory management has been conducted using knowledge of the past to forecast the needs of the present or future. For example, when considering what to order from a supplier, a restaurant manager will typically plan according to his or her previous experience. In this example, the manager may be planning his next inventory supply purchase based on last month's or last week's sales data in order to identify the correct amount of inventory to purchase. The advanced inventory management microservice 300 uses ML and deep learned algorithms in combination with a large swath of data and context to take an all-inclusive approach to inventory prediction and optimization by looking at all dimensions of a restaurant, its distributors, and its patrons in order to learn constantly. In this way the system can enhance traditional inventory forecasting in order to produce real-time, dynamic predictions and optimizations. In other embodiments, different machine and deep learning algorithms such as elastic net, random forest, neural networks, or gradient boosting models or other Artificial Intelligence techniques known to those skilled in the art may be implemented in the advanced inventory management microservice 300.

Figure 4:
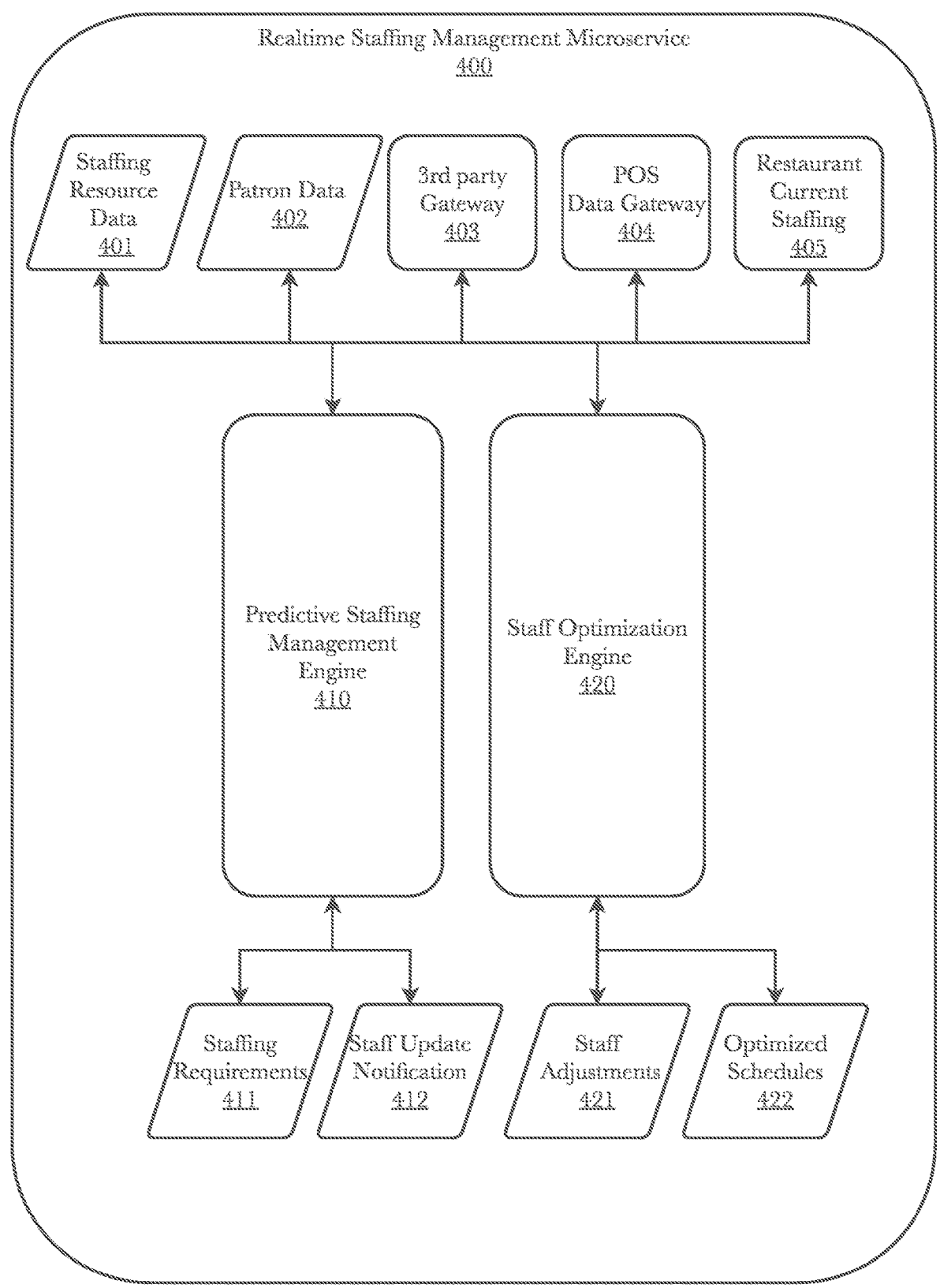
FIG. 4 is block diagram illustrating an exemplary system architecture for an aspect of the restaurant-as-a-service system, a real-time staffing management microservice.

FIG. 4 is block diagram illustrating an exemplary system architecture for an aspect of the restaurant-as-a-service system 100, a real-time staffing management microservice 400. According to an embodiment, real-time staffing management system 400 comprises, a predictive staffing management engine 410 and staffing optimization engine 420. A predictive staffing management engine 410 may connect to staffing resource data 401, patron data 402, and $3^{rd}$ party gateway 403, provide as output staffing requirements 411 and staff update notification 412; a staff optimization engine 420 may connect to POS data gateway 404 and current staffing data 405, and may provide as output staff adjustments 421 and optimized schedules 422.

Predictive staffing management engine 410 and staff optimization engine 420 may each comprise one or more machine and deep learned algorithms for producing staffing actions and suggestions which may be determined and optimized around one or more business metrics. According to an embodiment, different machine and deep learning algorithms such as elastic net, random forest, neural networks, or gradient boosting models or other artificial intelligence techniques known to those skilled in the art may be implemented in real-time staffing management microservice 300.

Staffing resource data 401 may be stored and retrieved from database(s) 120. Staffing resource data may include one or more staff profiles. Staff profiles may be created by a restaurant employee via an app on the employee's personal mobile device 130 or on a mobile device associated with the restaurant. According to an embodiment, staff profiles may be created automatically by real-time staffing management microservice 400 using staff data gathered from other microservices. For example, real-time staffing management microservice 400 may populate a staff profile with the staff member's name, address, and marital status using staff payroll information gathered from real-time financial microservice 200. A staff profile may contain staff information including, but not limited to, name, address, email, login credentials (e.g., username, password, security questions), connected devices, a current resume, bank account information (e.g., to set up autopay or implement contactless payments), bills and debt obligations (e.g., rent, cell phone, gas, insurance, student loan payments, car loan payments, etc.), work schedules, staff-specific customer reviews or comments, work status (e.g., scheduled, off, on-vacation, etc.), interests and hobbies, and a plurality of other information.

According to an aspect, staffing requirements 411 may include, but are not limited to, predicted number of optimal staff to employ (e.g., in total, per shift, per day, etc.), negotiating covered shifts (e.g., offering the staff an incentive for covering an unwanted shift, offering extra shifts to staff based on financial need, etc.), hiring forecasts, and others. For example, predictive staffing management engine 410 may receive staffing resource data 401, patron data 402, and $3^{rd}$ party data to match waiters with patrons on a reservation list based on historical data and real-time data in order to enhance the patron experience and maximize potential waiter earnings (e.g., tips) by matching waiters with patrons who have prior positive history, or that share similar interests or hobbies. Staff update notification 412 may be automatically generated and sent to staff mobile devices (e.g., through an in app messaging service or via short message service). For example, staff update notification 412 may be generated to disseminate staff work schedules, to alert staff of open shifts, to alert staff about payroll, to alert staff about important events associated with the restaurant, or to send incentive offers during shift negotiation actions, among other reasons.

Staff adjustments 421 may include, for example, hiring or firing of staff or number of hours a given staff member should be scheduled for. Staff optimization engine 420 may receive as input staff resource data 401, patron data 402, $3^{rd}$ party data, POS data, and current staffing 405 data in order to generate optimized schedules 422 which may be determined and optimized around one or more business metrics. For example, a current inventory item is close to reaching its expiration date, and so it has been incorporated into the daily special in order to sell as much of the inventory item before wastage occurs. In this example, staff optimization engine 420 may schedule the staff that have the best record (e.g., determined from historical sales data stored in database(s) 120) of upselling, in order to optimize the schedule around selling out the inventory item before it expires. Optimized schedules 422 may be optimized to various degrees, for example, staff may be scheduled to certain sections of the restaurant or even specific tables located within a section. Schedules may be optimized per shift, per day, per week, or any other segment of time.

Figure 5:
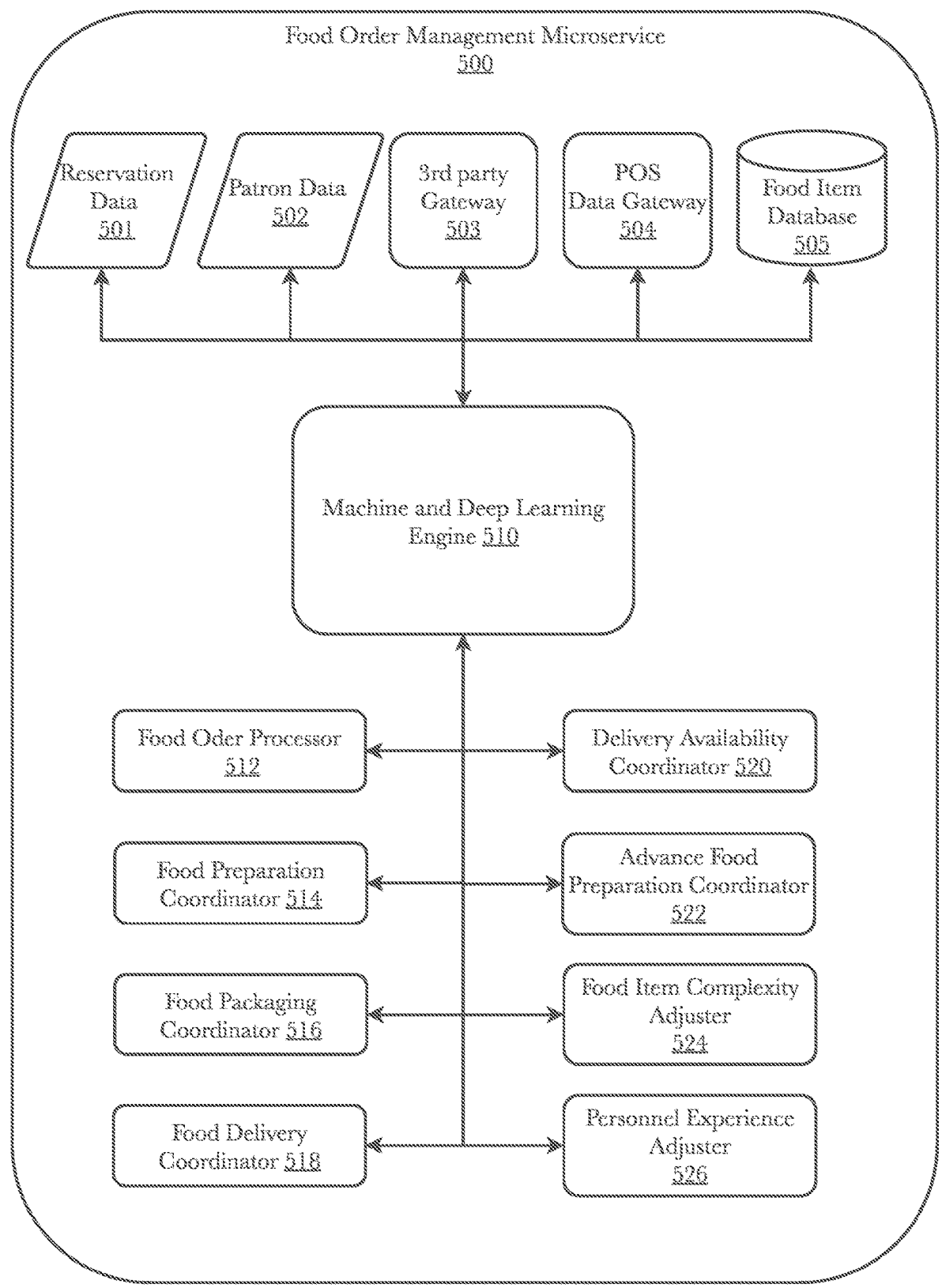
FIG. 5 is block diagram illustrating an exemplary system architecture for an aspect of the restaurant-as-a-service system, a food order management microservice.

FIG. 5 is block diagram illustrating an exemplary system architecture for an aspect of the restaurant-as-a-service system 100, a food order management microservice 500. According to an embodiment, the food order management microservice 500 may include at least one or more processor, a food item database 505, and a memory, at least one input device interface, at least one network interface, and at least one output device interface. The processor may be communicatively coupled to the food items database 505, the memory, the at least one input device interface, the at least one network interface, and the at least one output interface.

According to an embodiment, food order management microservice 500 may receive, retrieve, or otherwise obtain a plurality of information from database(s) 120, food item database 505, system 100 connected mobile device(s) 130, restaurant computers and mobile devices, $3^{rd}$ party gateways 503, POS data gateway 504, and other microservices which may be implemented on platform 110. For example, the plurality of information may include reservation data 501, patron data 502 (e.g., from a patron profile), food item details such as ingredients, potential ingredient substitutions, ingredient cost, ingredient preparation time (e.g., time to cook, time to pre-prepare such as dicing vegetables for soup stock preparation), food packaging inventory data (e.g., to-go order packaging), and staff profile data. Food order management microservice 500 may further comprise a machine and deep learning engine 510 which may comprise one or more machine and deep learning algorithms which determine and optimize food order management actions around one or more business metrics. Machine and deep learning engine 510 may be accessed by a plurality of microservice components in order to optimize coordination between food preparation stations and other restaurant sections (e.g., front-of-house, food delivery microservices, etc.).

In an embodiment, food order management microservice 500 is configured to be communicatively coupled to a food preparation display in the food preparation area 704 (referencing FIG. 7), a food order pick-up display in the food order pick-up area 706, a food packaging display in the food packaging area 708, and a delivery order pick-up display in the delivery order pick-up area 710 via the at least one output interface. In an embodiment, the at least one input device interface is configured to be communicatively coupled to one or more of a keyboard, a touchscreen, and a mouse. Food order management microservice 500 may include additional components that facilitate the operation of the food order management microservice 500. The food order management microservice 500 may include fewer than the described components.

In an embodiment the food order management microservice 500 is a centralized system. In an embodiment, the food order management microservice 500 is a distributed system, for example across a cluster of computing devices. In an embodiment, the food item database 505 is disposed locally at the business establishment 700. In an embodiment, the food items database 505 is disposed at a location remote from the business establishment 700. In an embodiment, the food item database 505 is a component of the food order management microservice 500. In an embodiment, the food item database 505 is an independent database that is not a component of the food order management microservice 500. The food item database 505 is configured to store an estimated food item preparation time and an estimated food item packaging time for each food item on the menu 714. Food item database 505 may be located in database(s) 120.

In an embodiment, a food order processor 512, a food preparation coordinator 514, a food packaging coordinator 516, and a food delivery coordinator 518 are stored in the memory. In an embodiment, one or more of a delivery order availability coordinator 520, an advance food preparation coordinator 522, a food item complexity adjustor 524, and a personnel experience adjustor 526 are stored in the memory. Additional components may be stored in the memory that facilitate the operation of the food order management microservice 500.

The food order processor 512 receives food orders that are placed at the food order management microservice 500 for processing. The business establishment 700 may provide one or more different options to a customer for placing a food order including food items selected from the menu 714.

In an embodiment, customers are provided with the option of placing food orders with business establishment personnel. The business establishment personnel manually enter the received food orders into the food order management microservice 500 via one or more input devices that are communicatively coupled to the at least one input device interface. For example, a customer may wish to dine at the business establishment 700. After the customer is seated in the dine-in seating area 712, the customer places a food order including food items selected from the menu 714 with business establishment personnel. An example of business establishment personnel is a waiter or a waitress. The waiter or waitress enters the food order into the food order management microservice 500. The food order is received by the food order processor 512.

In an embodiment, a customer is provided with the option of calling the business establishment 700 and placing food orders with business establishment personnel. The business establishment personnel manually enter the received food orders into the food order management microservice 500 via one or more input devices (e.g., mobile devices 130 or website/webapp 150) that are communicatively coupled to the at least one input device interface. For example, a customer may call the business establishment 700 to place a food order with food items selected from the menu 714 for delivery with business establishment personnel. The food order is received by the food order processor 512.

In an embodiment, a customer is provided with the option of placing food orders with food items selected from the menu 714 via a drive thru interface. For example, a customer may place a food order with food items selected from the menu 714 for pick-up at a drive thru window. Business establishment personnel that staff the drive thru manually enter the received food orders into the food order management microservice 500 via one or more input devices that are communicatively coupled to the at least one input device interface. The food order is received by the food order processor 512.

In an embodiment, a customer is provided with the option of placing a food order with food items selected from the menu 714 electronically via an establishment web site or online portal using a customer electronic device. The food order management microservice 500 is configured to be communicatively coupled to the establishment web site or online portal. Food orders placed via the establishment web site or online portal are received by the food order management microservice 500 via the at least one network interface. Examples of customer electronic devices that may be used to access the establishment web site or online portal to place a food order include, but are not limited to, a mobile computing device 130, a cell phone, a desktop computer, and a tablet. The food order is received by the food order processor 512.

In an embodiment, a customer is provided with the option of placing a food order with food items selected from the menu 714 electronically via a kiosk located within the business establishment 700. The food order management microservice 500 is configured to be communicatively coupled to the kiosk via one of the at least one network interface or the at least one input device interface. The food order is received by the food order processor 512.

In an embodiment, each of the tables in the dine-in seating area 712 is equipped with a table order placement device. When a customer is seated at a table in the dine-in seating area 712, the customer is provided with the option of placing a food order with food items selected from the menu 714 electronically via the table order placement device. The food order management microservice 500 is configured to be communicatively coupled to each of the table order placement devices via the at least one network interface or the at least one input device interface. The food order is received by the food order processor 512.

While a number of different options for placing a food order that is received by the food order management microservice 500 have been described, alternative mechanisms for placing of a food order may be used.

Upon the receipt of a food order at the food order management microservice 500, the food order processor 512 identifies the food items in the food order and determines whether the food order is a designated for dine-in at the business establishment 700 or for delivery to a food order delivery destination. If the food order is designated for delivery, the food order processor 512 identifies the food order delivery destination for the food order. The food order processor 512 provides the food order, the identified food items to the food order, and the designation of the food order as being for dine-in or for delivery to the food preparation coordinator 514.

Different food items often have different food item preparation times. The estimated food item preparation time for a food item is an estimate of the amount of time that it takes food preparation personnel in the food preparation area 704 to prepare the food item. The estimated food item preparation time for each food item on the menu 714 is stored in the food item database 505. In an embodiment, the estimated food item preparation time for a food item is based on an analysis of historical food item preparation times for that food item by the food order management microservice 500. The food order management microservice 500 tracks the actual food item preparation time that it takes to prepare the food item in the food preparation area 704 and updates the estimated food item preparation time for that food item in the food item database 505 in accordance with the tracked actual food item preparation times. In an embodiment, the food management microservice 500 employs time estimation algorithms to generate the estimated food item preparation times for the different food items and stores the generated estimated food item preparation times in the food item database 505.

The food preparation coordinator 514 receives the food order, the identified food items in the food order, and the designation of the food order as being for dine-in or for delivery from the food order processor 512. The food preparation coordinator 514 accesses the food item database 505 and retrieves the estimated food item preparation time for each of the food items in the food order from the food item database 505. The food preparation coordinator 514 generates an estimated food order preparation time for the food order based on the retrieved estimated food item preparation times for each of the food items in the food order.

The food preparation coordinator 514 identifies the earliest food preparation time available to prepare the food items in the food order in the food preparation area 704. The food preparation coordinator 514 tracks the number of pending food orders for dine-in and for delivery that are awaiting preparation or are scheduled to be prepared in the food preparation area 704. The food preparation coordinator 514 identifies the earliest available food order preparation time for the food order based on the number of pending food orders and the status of the pending food orders. The food preparation coordinator 514 assigns the identified food order preparation time to the food order. The food preparation coordinator 514 generates a predicted food order ready time for the food order based on the assigned food preparation time and the estimated food order preparation time.

In an embodiment, the food order management microservice 500 coordinates the preparation of the food items in the food preparation area 704 sequentially. In an embodiment, the food order management microservice 500 coordinates a parallel preparation of one or more food items in the food order in the food preparation area 704. The food preparation coordinator 514 identifies the earliest available food preparation times for each food item in the food order and assigns each of food items to individual food preparation times. The food preparation coordinator 514 generates the predicted food order ready time for the food order based on the food preparation times assigned to individual food items in the food order and the estimated food item preparation time for each food item in the food order.

The food preparation coordinator 514 tracks the actual food item food preparation time for the preparation of each of the food items in the food order as well as the food preparation times associated other food orders that are scheduled for preparation in the food preparation area 704. The food preparation coordinator 514 updates the predicted food order ready time based on one or both of the actual food item food preparation time for the preparation of each of the food items in the food order and the actual food order preparation times associated other food orders that are scheduled for preparation in the food preparation area 704. The food order management microservice 500 updates the estimated food item preparation times in the food item database 500 for each of the food items in the food order based on the actual food item preparation times tracked by the food preparation coordinator 514.

In an embodiment, the food order management microservice 500 is communicatively coupled to cameras and/or other types of sensors located in the food preparation area 704 via the at least one input device interface. The cameras and/or other types of sensors provide feedback to the food preparation coordinator 514 regarding the actual food item preparation time of food items in the food preparation area.

In an embodiment, the food order management microservice 500 includes a food item complexity adjustor 524. The food preparation coordinator 514 provides the food item complexity adjuster 524 with the food order, the food items in the food order, the estimated food item preparation times for each food item in the food order, the estimated food order preparation time for the food order, and the predicted food order ready time for the food order. The food item complexity adjuster 524 identifies a food item complexity factor associated with each of the food items in the food order. The food item complexity factor for each food items identifies whether additional food item preparation time is needed for specific food items in the food order. For example, a food item having a routine complexity may have a food item complexity factor of one and a food item that is relatively more complex may have a food item complexity factor of two.

The food item complexity adjuster 524 adjusts the estimated food item preparation times for each of the food items in the food order by the food item complexity factor, generates an adjusted estimated food order preparation time based on the adjusted estimated food item preparations times for each of the food items in the food order. The food item complexity adjuster 524 updates the predicted food order ready time based on the adjusted estimated food order preparation time. The food item complexity adjuster 524 provides the food preparation coordinator 514 with the adjusted estimated food item preparation times for each of the food items in the food order, the adjusted estimated food order preparation time, and the updated predicted food order ready time.

In an embodiment, the food order management microservice 500 includes a personnel experience adjustor 526. The food preparation coordinator 514 provides the personnel experience adjustor 526 with the food order, the food items in the food order, the estimated food item preparation times for each food item in the food order, the estimated food order preparation time for the food order, and the predicted food order ready time. The personnel experience adjustor 526 assigns specific food preparation personnel to prepare specific food items in the food order. The personnel experience adjustor 526 identifies a personnel skill factor for each of the food preparation personnel assigned to prepare each food item in the food order. For example, a relatively more experienced food preparation personnel may have a personnel skill factor of 0.75 while a novice food preparation personnel may have a personnel skill factor of 1.5.

The personnel experience adjustor 526 adjusts the estimated food item preparation times for each of the food items in the food order by the personnel skill factor associated with the food preparation personnel assigned to prepare the food item and generates an adjusted estimated food item preparation time for each food item in the food order. The personnel experience adjustor 526 uses the adjusted estimated food item preparation times for the food items in the food order to generate an adjusted estimated food order preparation time and uses the adjusted estimated food order preparation time to generate an adjusted predicted food order ready time. The personnel experience adjustor 526 provides the food preparation coordinator 514 with the adjusted estimated food item preparation times for each of the food items in the food order, the adjusted estimated food order preparation time, and the updated predicted food order ready time to the food preparation coordinator 514.

If the food items in the food order were designated for a dine-in customer, the at least one or more processor issues a command to display the food order including the food items in the food order, the estimated food item preparation time for each of the food items in the food order, the estimated food order preparation time, and the predicted food order ready time on the food preparation display in the food preparation area 704 via an output device interface and a command to display the food order including the food items in the food order and the predicted the food order ready time on the food pick-up display in the food order pick-up area 706 via an output device interface at approximately the same time.

For a more detailed description of the components and operations of the microservice 500, please refer to U.S. application Ser. No. 17/037,200, which has been incorporated herein by reference.

According to some embodiments, platform 110 may comprise an optimized routing for food delivery microservice which may be utilized by a restaurant to manage and coordinate food orders for delivery or pick-up with restaurant drivers and $3^{rd}$ party food delivery drivers. Food order management microservice 500 may exchange data with an optimized routing for food delivery microservice to coordinate food delivery pick-up times with food preparation and food packaging staff such that when the food order arrives at its destination it is in optimal eating conditions. Optimized routing for food delivery microservice may receive a data routing request from a mobile device 130 or website 150, which may then process the request, along with a plurality of data such as food order contents, patron profile data (e.g., address, phone number, preferences, etc.), food order destination address, delivery driver location and estimated time of arrival data, external data (e.g., map data, weather, traffic data, GPS data), food preparation data, etc., using one or more machine and deep learned algorithms, to coordinate the delivery of the food order to the food order delivery destination, to generate as outputs a predicted food order delivery time and an optimized food delivery route, among other things.

Figure 6:
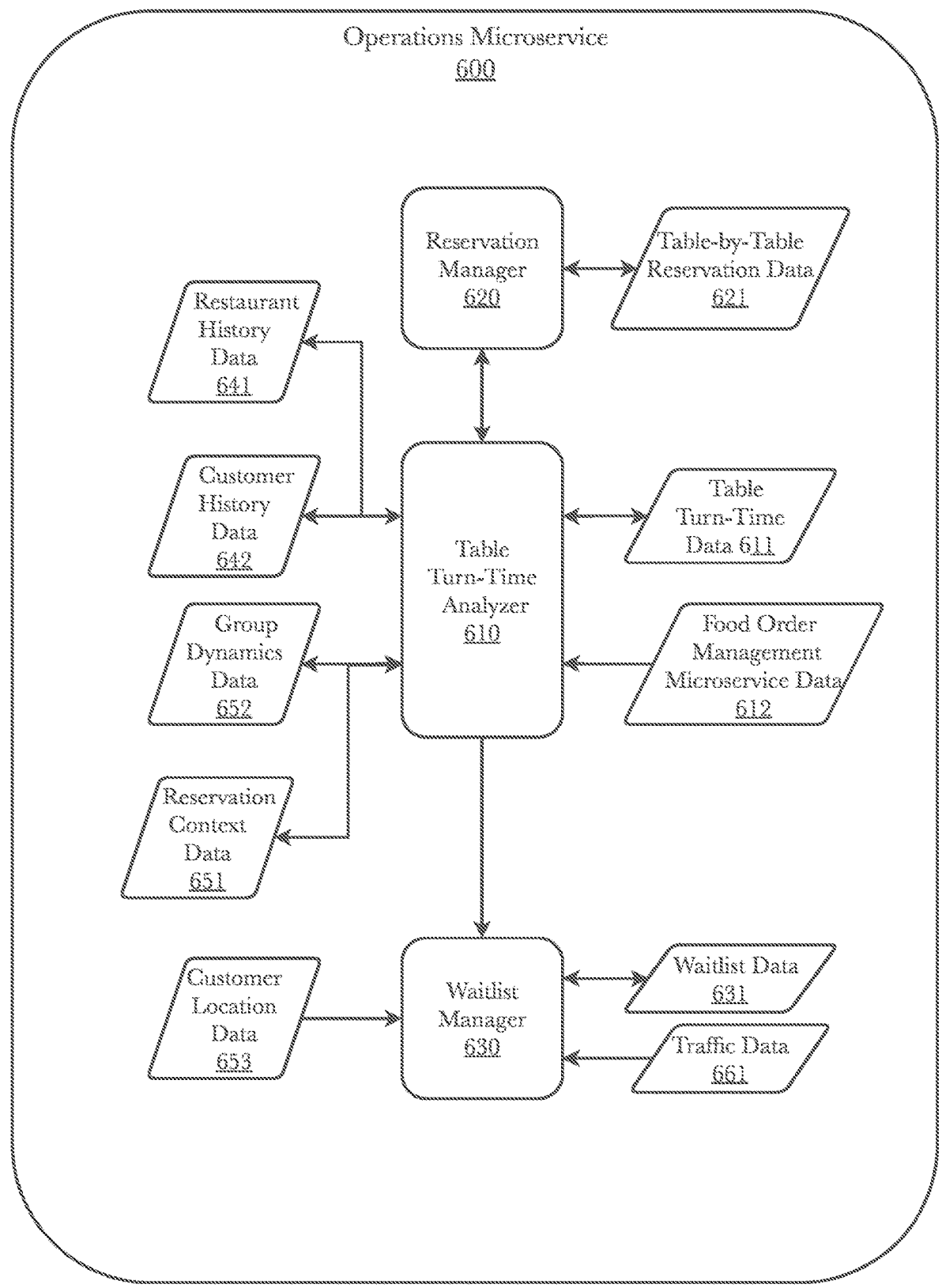
FIG. 6 is block diagram illustrating an exemplary system architecture for an aspect of the restaurant-as-a-service system, an operations microservice.

FIG. 6 is block diagram illustrating an exemplary system architecture for an aspect of the restaurant-as-a-service system 100, an operations microservice 600. Operations microservice 600 may provide a participating restaurant a sort of virtual host or maître de that can manage front-of-house restaurant-patron interactions such as managing restaurant reservations or waitlist, overseeing table turnover, and assigning patrons tables, among various other actions. In this way, a restaurant could leverage operations microservice 600 to autonomously manage both patron relations and table turn over.

According to an embodiment, operations microservice 600 may facilitate dynamic reservation and waitlist management using precision table turn-time analysis. Although other configurations are possible and not all components may be required, the system in this embodiment comprises a table turn-time analyzer 610, a reservation manager 620, a waitlist manager 630, one or more database(s) 120. The table turn-time analyzer 610 retrieves relevant data such as food order management system data 612, restaurant history data 641 and customer history data 642 from a database(s) 120, and makes predictions for table-by-table turn times based on current and historical data. The restaurant history data 641 comprises data regarding historical table turn-times, and may include data that supplement or augment the historical table turn-times such as differences in turn-times based on a variety of factors such as time of day, day of the week, type(s) of food ordered at a given table, food preparation times, the restaurant staff on duty and their experience levels, customer mix, special event information, and other information that may explain or add precision to the historical table turn-times. The customer history data 642 comprises data about repeat customers of the restaurant. The customer history data 642 may be acquired in a number of ways. For example, it may be entered manually by restaurant staff who know the customer well (e.g., for "regulars" whose habits the restaurant staff know well), or may be entered when a reservation or seating is made after querying the customer, or may be captured from a customer mobile device 130 running an application designed to interact with the system 100. Customer mobile devices 130 running an application programmed to connect to, and interact with, the system 100 may supply the system 100 with additional relevant data such as reservation context data 651, group dynamics data 652, and customer location data 653. Reservation context data 651 comprises information that suggests a context in which the reservation is being made such as for a particular purpose like a business meeting or a romantic date, for a special event like a wedding or celebration of a sports event win. The context of a reservation may provide important information regarding the length of time that the customer or customers will remain at the restaurant, and therefore may affect table turn-time calculations. Reservation context data 651 may be obtained by querying the customer at the time the reservation is made, either in person, on the phone, or through submission of a reservation form online, or by inference from other data such as customer history data (e.g., if customer history data of two customers indicates that they often have business meetings together on Mondays). Reservation context data may further give rise to group dynamics data 652. Group dynamics data 652 comprises information related to two or more customers which may further impact the length of stay at the restaurant. For example, a group of single sports fans at a sports bar may stay to watch the entire length of a game, whereas a group of sports fans with kids may not be able to stay for the entire game. Customer location data 653 comprises information about the customer's location relative to the restaurant, and may be used by the waitlist manager to prioritize or re-organize waitlist slots. Customer location data 653 may be obtained visually (e.g., by restaurant staff) or electronically, for example, by sending a text query to a customer mobile device 130 or by having the customer mobile device 130 send location information to the microservice (for example, satellite-based global positioning data).

Reservation manager 620 may receive, retrieve, or otherwise obtain table-by-table reservation data 621 from database(s) 120 to use as input into one or more algorithms (e.g., machine and deep learning algorithms) in order to dynamically analyze and process restaurant reservation requests. For example, analysis may involve identifying any special requests that may be associated with a reservation request, and then assign a priority score such that reservations with higher priority score are given priority over lesser scored reservations. Additionally, reservation manager 620 may be responsible for assigning tables to reservation requests, checking in patrons when they arrive at a restaurant, dynamically rescheduling reservations due to patron and restaurant circumstances, and receiving and scheduling a reservation request.

According to an embodiment, table turn-time analyzer 610 may take as inputs restaurant history data 641, customer history data 642, group dynamics data 652, reservation context data 651, table turn-time data 611, and food order management microservice data 612, and produce as outputs dynamic table turn-time estimates which may be used by other components within operations microservice 600 or by restaurant staff to make seating and scheduling decisions.

According to an embodiment, the process is initiated when a group is seated at a table. Restaurant history data 641, customer history data 642, and reservation context data 651 are retrieved and analyzed, and a preliminary table turn-time estimate for that table is created. For example, if the restaurant history indicates that groups of five persons dining at a particular time of the week are typically business professionals having a quick lunch, it may be expected that the table turn-time for a group of five seated during that time will take 40 minutes. The preliminary table turn-time estimate will suggest a particular group dynamic, but it is possible that actual group dynamics are different than expected. Group dynamics may be analyzed to determine whether they are as expected or predicted given the data previously retrieved. Group dynamics may be obtained, for example, by comparing customer profiles obtained from each customer's mobile device 130 or stored in each customer's customer history data 642, or from manual inputs by restaurant staff. Once the customers have ordered, their orders may be checked against the customer history data 642 that was used to create the preliminary table turn-time estimate. If the orders do not correspond to the customer history data 642, an adjustment may be made for special or unusual orders. At this point, restaurant dynamics may be checked to determine any known or predicted factors that may affect the table turn-time.

According to an embodiment, dynamic waitlist manager 630 may automatically and in real-time, using a variety of input data, analyze and process restaurant waitlist requests via one or more algorithms which may be machine and deep learned algorithms. According to an embodiment, the process is initiated by a request from a customer to be placed on the waitlist (alternatively, wait list) for a table. This request may be placed by the customer while at the restaurant or remotely (e.g., by telephone, or through an application running on the customer's mobile device 130, while the customer is en-route to the restaurant. A determination is made as to whether the customer is at the restaurant when the reservation is made. If the customer is at not the restaurant, the customer's location data 653 and traffic data 661 are gathered, and the customer's arrival time at the restaurant is estimated. If the customer is at the restaurant or the customer's arrival time has been estimated, waitlist data 631 and table turn-time data 611 are retrieved and based on an analysis of the data, the customer is assigned a spot (or slot) on the waitlist and notified of the expected wait time. A customer on the waitlist may either have placed the request from a remote location, or may wander about or change locations while waiting for a table. For example, if the restaurant is located at a mall or other shopping location, a customer on the waitlist may spend his or her expected wait time shopping. When the customer's table is ready, the customer's status is determined. If the customer is at the restaurant, he or she will be seated, removed from the waitlist, and updates will occur to restaurant and customer history data and estimated table turn-times and reservation data. A customer who is not at the restaurant when the table is ready, but who is moving toward the restaurant will be assumed to be returning to the restaurant. That customer's location data 653 and traffic data 661 may again be retrieved to adjust his or her estimated arrival time, and may be re-assigned a later spot on the waitlist. A customer who is not at the restaurant when the table is ready and who is moving away from the restaurant will be assumed to be leaving and not returning to the restaurant, and a query is made of the customer's intent. The query may be made by any means reasonably available, such as a phone call, a text message, or through a system 100 connected application running on the customer's mobile device 130. If the customer responds and indicates that he or she is not returning or does not respond, the customer will be removed from the waitlist, and the restaurant 641 and customer history data 642 will be updated. The updates may include a reason for the customer's removal, and where the removal was justified (e.g., wait time longer than expected), the customer's history data may be adjusted to prioritize the customer in the waitlist on subsequent visits. Where the removal was not justified, the customer's history data may be adjusted to de-prioritize the customer in the waitlist on subsequent visits. If the customer indicates that he or she is returning, the customer's spot on the waitlist is adjusted, and re-assigned.

For a more detailed description of the components and operations of the microservice 600, please refer to U.S. application Ser. No. 17/037,200, which has been incorporated herein by reference.

Detailed Description of Exemplary Aspects

Figure 7:
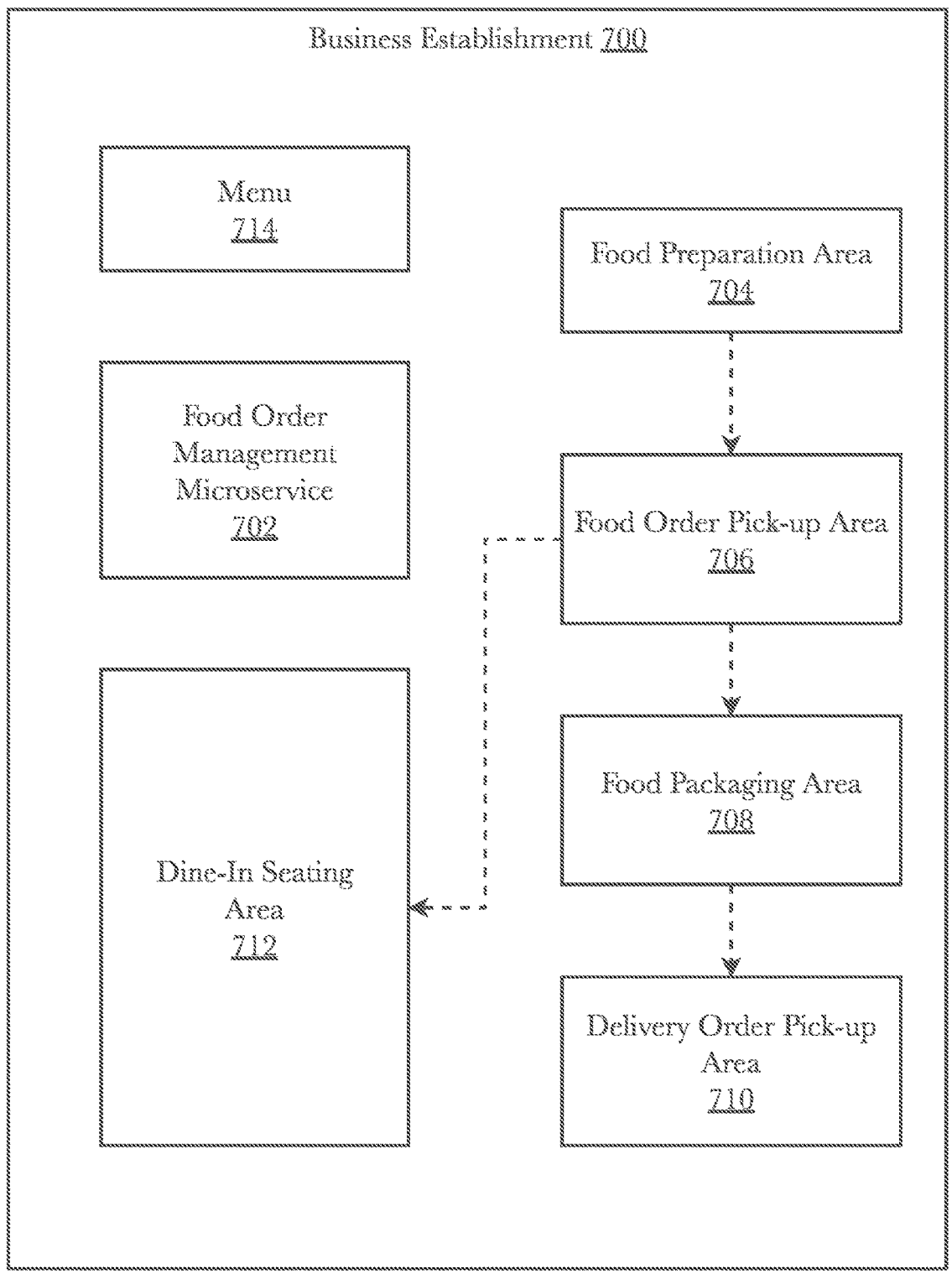
FIG. 7 is a block diagram representation of a business establishment including an embodiment of a food order management microservice is shown.

FIG. 7 is a block diagram representation of a business establishment 700 including an embodiment of a food order management microservice 702 is shown. Food order management microservice 702, or any other microservice available on platform 110, may be accessed through a restaurant computer using a website/webapp 150, through a restaurant POS device, and through restaurant mobile devices 130. Examples of business establishments 700 include, but are not limited to, a restaurant, a food delivery service, and a combination restaurant/food delivery service. In an embodiment, the business establishment 700 includes a food preparation area 704, a food order pick-up area 706, a food packaging area 708, a delivery order pick-up area 710, and a dine-in seating area 712. While the food preparation area 704, the food order pick-up area 706, the food packaging area 708, the delivery order pick-up area 710, and the dine-in seating area 712 are shown as being in different areas within the business establishment 700, one or more of the described areas may be integrated into a single area or may occupy overlapping areas in the business establishment 700. Different embodiments of business establishments 700 may include one or more of the food preparation area 704, the food order pick-up area 706, the food packaging area 708, the delivery order pick-up area 710, and the dine-in seating area 712. The business establishment 700 may include additional areas that facilitate the operation of the business establishment 700.

The business establishment 700 includes a menu 714 with a listing of a plurality of different food items that are available for order at the business establishment 700. A customer of the business establishment 700 is provided with the option of selecting one or more of the food items from the menu 714 to place a food order. In an embodiment, the food order management microservice 702 is configured to receive food orders entered manually by business establishment personnel via a food order management microservice input device (e.g., computer, mobile device, POS device, etc.). In an embodiment, the food order management microservice 702 is configured to receive food orders electronically via a food order management microservice network interface. In an embodiment, the food order management microservice 702 is configured to received food orders entered manually by business establishment personnel via a food order management system input device and electronically via a food order management system network interface.

Food items in a food order are prepared in the food preparation area 704 and the completed food orders are placed in the food order pick-up area 706. Upon the receipt of a food order from a dine-in customer, the food order management microservice 702 coordinates the preparation of the food items in the food order in the food preparation area 704 and generates a predicted food order ready time. Different food items in the food order may have different food item preparation times. The predicted food order ready time specifies when the prepared food order is expected to be placed in the food order pick-up area 706. In an embodiment, the food order management microservice 702 updates the predicted food order ready time based on the actual food item preparation time taken by food preparation personnel to prepare each of the food items in the food order in the food preparation area 704. Providing a predicted food order ready time at the time a food order is received may enable a waiter/waitress to inform a dine-in customer of when they can expect to receive the food items in their food order.

When a food order is received for delivery, the food items in the food order are prepared in the food order preparation area 704 and the completed food orders are placed in the food order pick-up area 706. Food packaging personnel pick up the complete food orders from the food order pick-up area 706 for packaging in the food packaging area 708. The packaged food orders are placed in the delivery order pick-up area 710. Delivery personnel pick up the packaged food from the delivery order pick-up area 710 for delivery to a food order delivery destination.

Upon the receipt of a food order for delivery, the food order management microservice 702 coordinates the preparation of the food items in the food order in the food preparation area 704, generates a predicted food order ready time, coordinates the packaging of the food items in the food order, generates a predicted packaged food order ready time, coordinates the delivery of the food order to the food order delivery destination, and generates a predicted food order delivery time. Different food items in the food order may have different food item preparation times and/or different food item packaging times.

The predicted food order ready time specifies when the prepared food order is expected to be placed in the food order pick-up area 706 for pick-up. The predicted food order ready time provides food packaging personnel with notice regarding when the food order will be available to be picked up from the food order pick-up area 706 for packaging in the food packaging area 708. The predicted packaged food order ready time specifies when the packaged food order is expected to be placed in the delivery order pick-up area 710 for pick-up by delivery personnel. The predicted food order delivery time specifies when the food order is expected to be delivered to the food order delivery destination. The food order management microservice 702 generates the predicted food order delivery time based on delivery route specific data associated with the delivery route.

In an embodiment, the food order management microservice 702 updates the predicted food order ready time based on the actual food item preparation time taken by food preparation personnel to prepare each of the food items the food order in the food preparation area 704. In an embodiment, the food order management microservice 702 updates the predicted packaged food order ready time based on one or more of the actual food item preparation time taken by food preparation personnel to prepare each of the food items the food order in the food preparation area 704 and the actual food item packaging time taken by food packaging personnel to package each of the food items in the food order in the food packaging area 708. In an embodiment, the food order management microservice 702 updates the predicted food order delivery time based on one or more of the actual food item preparation time taken by food preparation personnel to prepare each of the food items the food order in the food preparation area 704, the actual food item packaging time taken by food packaging personnel to package each of the food items in the food order in the food packaging area 708, and changes in delivery route specific data associated with the delivery route associated with delivering the food order to the food order delivery destination.

Figure 8:
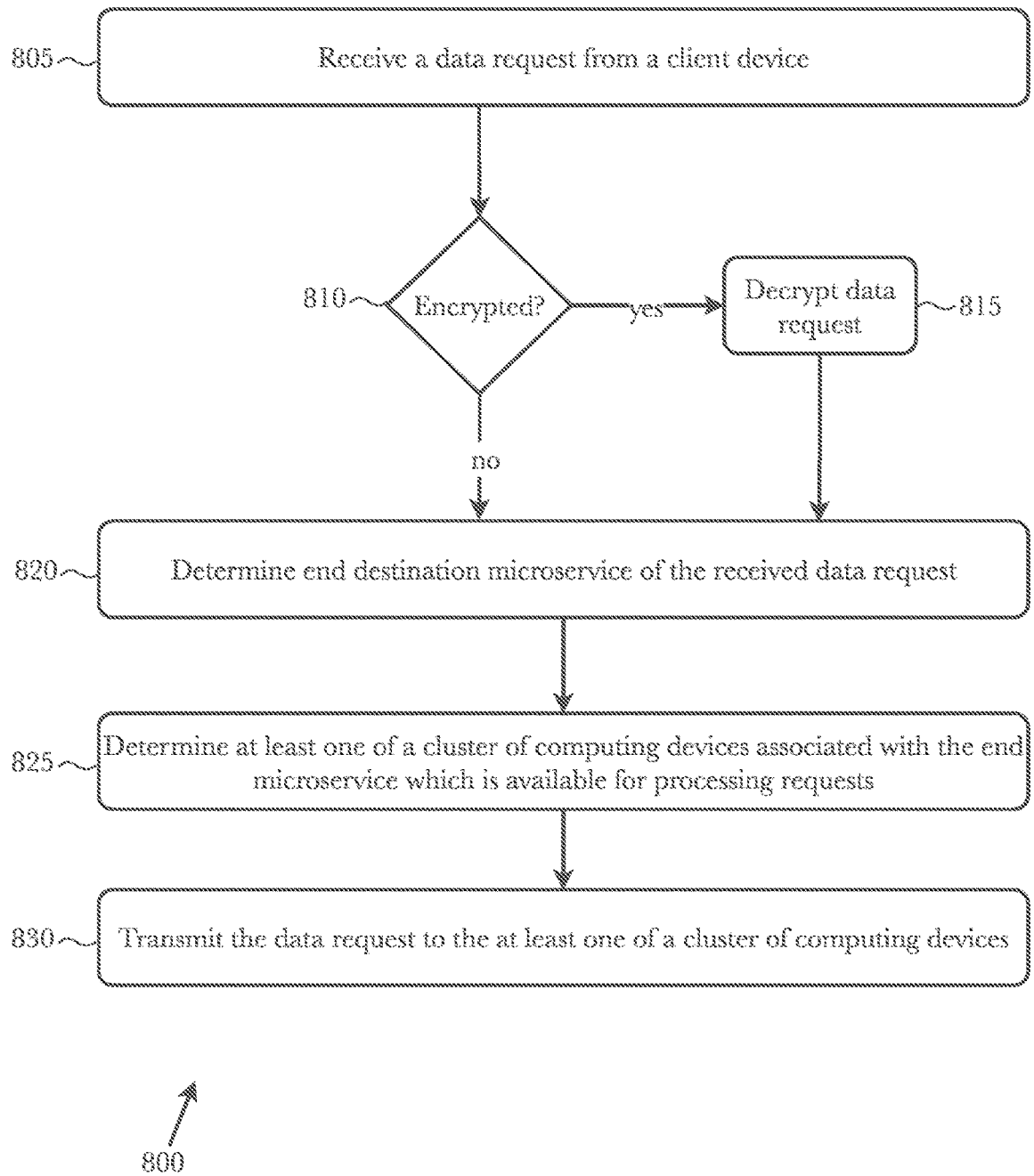
FIG. 8 is a flow diagram illustrating an exemplary method for assigning a data request to an end destination computing device, according to aspect.

FIG. 8 is a flow diagram illustrating an exemplary method 800 for assigning a data request to an end destination computing device, according to aspect. According to an embodiment, the process begins when platform 110 receives a data request from a client device 805 such as a mobile device or a computer. Then the received data request may be analyzed to determine if it is an encrypted data request 810, and if it is encrypted then the data request may be decrypted 815. After decryption, or in the case that the data request was unencrypted, system 100 or one of its components, such as the cluster manager 117, may analyze the meta data associated with the received data request to determine an end destination microservice 820. For example, there may be a URL attached as meta data to the data request which identifies the microservice which is to process the data request. Once an end destination microservice has been determined, a load balancing algorithm may be utilized to determine at least one of a cluster of computing devices associated with the end microservice which is available for processing requests 825. Finally, the received data request is transmitted to the at least one of a cluster of computing devices 830 where a microservice may process the data request.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 9:
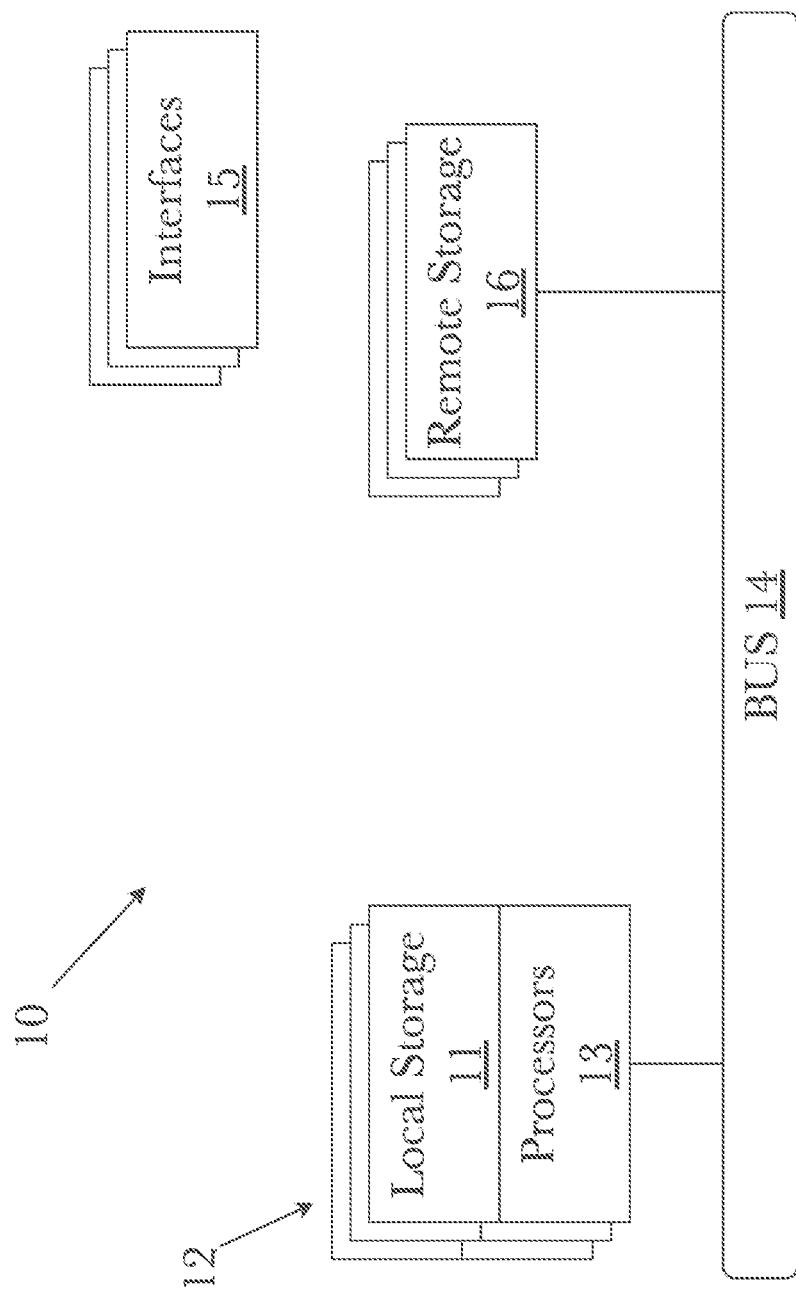
FIG. 9 is a block diagram illustrating an exemplary hardware architecture of a computing device.

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 9 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 10:
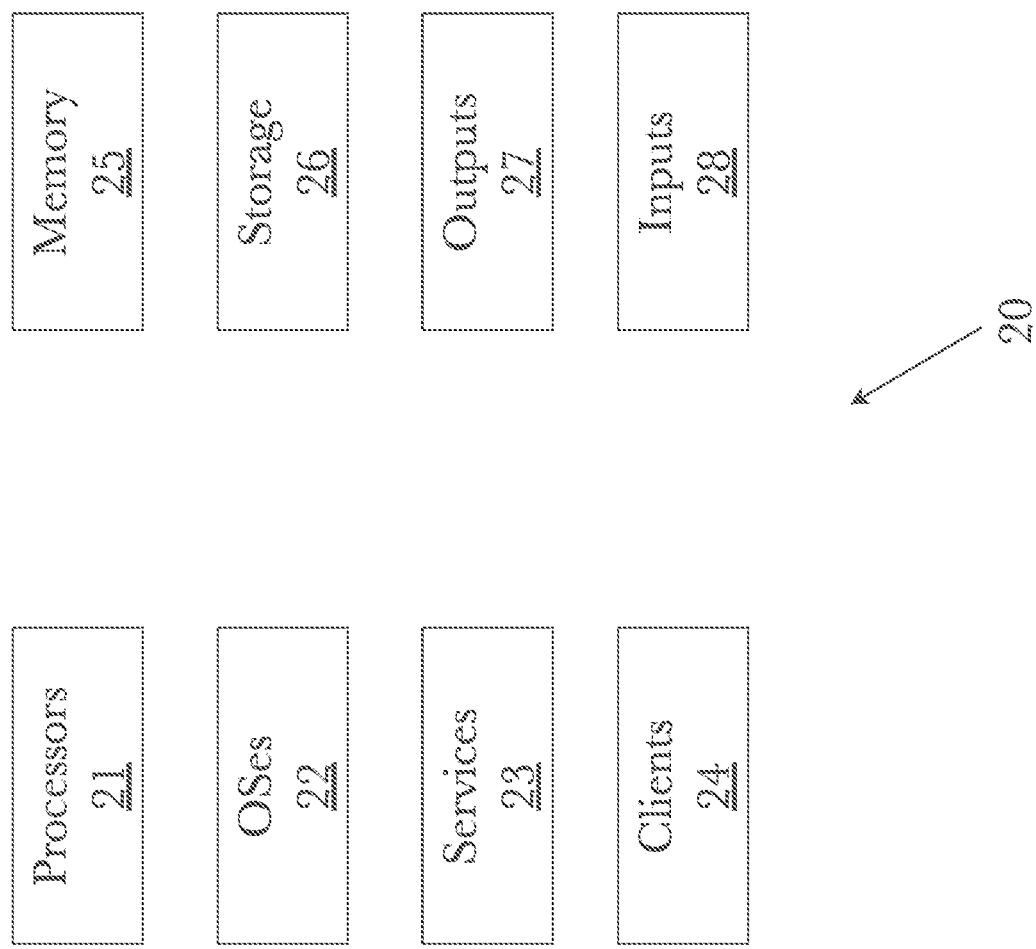
FIG. 10 is a block diagram illustrating an exemplary logical architecture for a client device.

In some aspects, systems may be implemented on a standalone computing system. Referring now to FIG. 10, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 9). Examples of storage devices 26 include flash memory, magnetic hard drive, CD-ROM, and/or the like.

Figure 11:
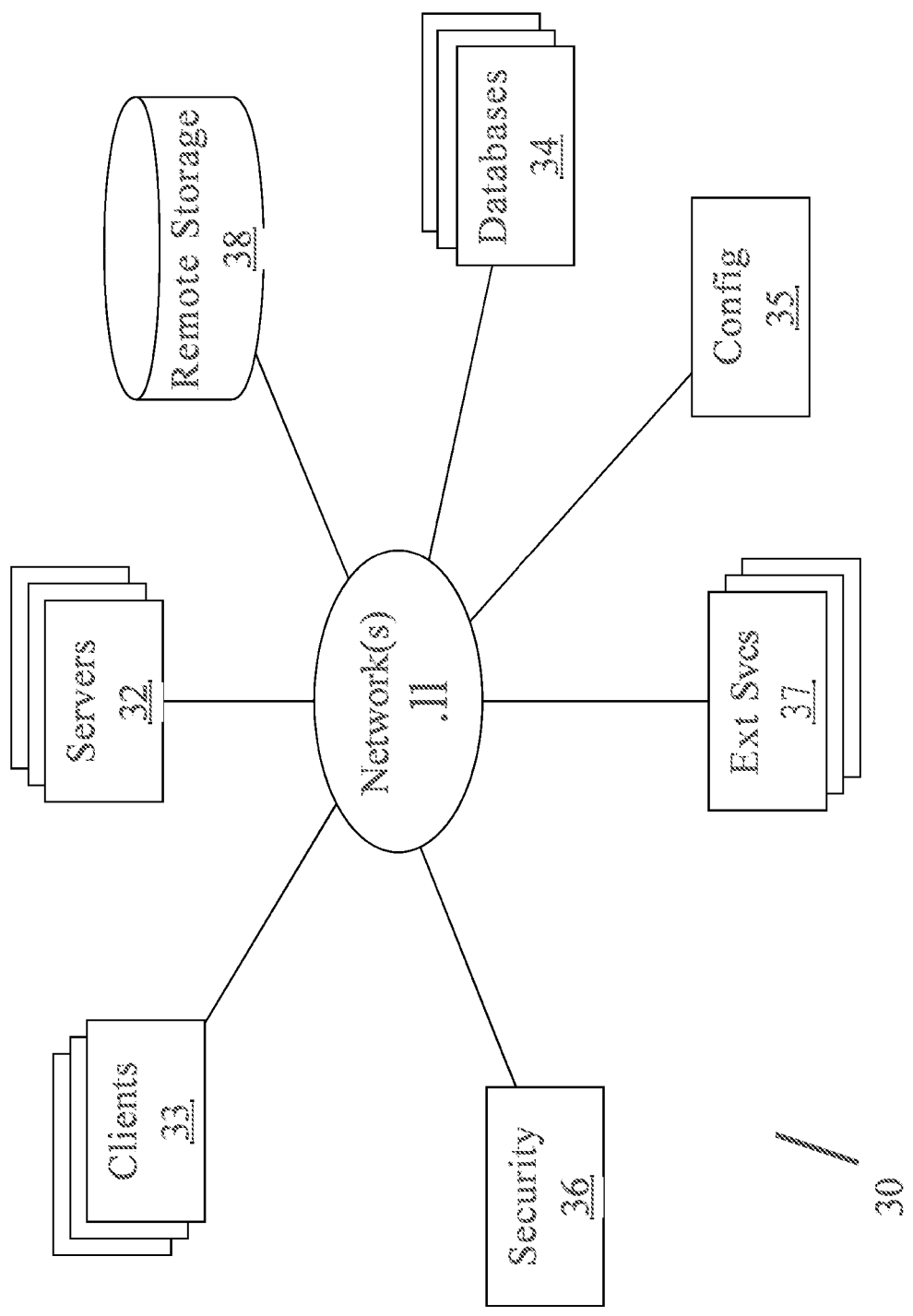
FIG. 11 is a block diagram showing an exemplary architectural arrangement of clients, servers, and external services.

In some aspects, systems may be implemented on a distributed computing network, such as one having any number of clients and/or servers. Referring now to FIG. 11, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 10. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security microservices known in the art now or in the future may be used in conjunction with aspects without limitation, unless a specific security 36 or configuration system 35 or approach is specifically required by the description of any specific aspect.

Figure 12:
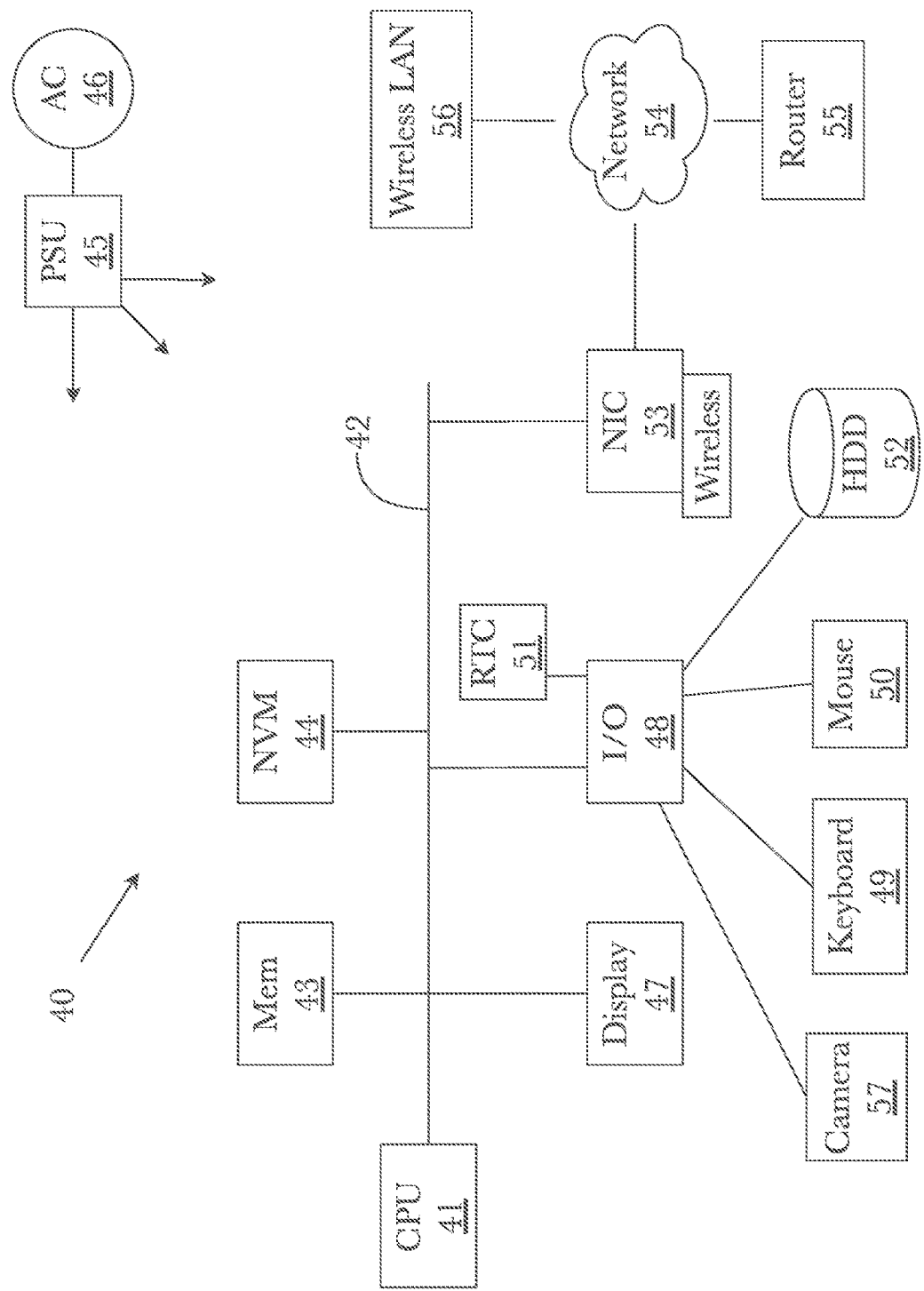
FIG. 12 is another block diagram illustrating an exemplary hardware architecture of a computing device.

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A restaurant-as-a-service platform, comprising:
a distributed network of computing devices configured to operate as a single platform wherein each computing device of the distributed network comprises a memory a processor, and a non-volatile data storage device;
a restaurant database stored on the non-volatile data storage device of one or more of the computing devices of the distributed network of computing devices, the restaurant database comprising financial information, inventory information, staffing information, patron information, and food preparation data for each of a plurality of restaurants;
a cluster manager comprising a first plurality of programming instructions stored in the memory of, and operating on the processor of, a first computing device of the distributed network of computing devices wherein the cluster manager is configured to:
  receive microservice requests from client devices;
  distribute the microservice requests to computing devices of the distributed network of computing devices using a load balancing algorithm;
  receive microservice outputs from the distributed microservice requests; and
  for each microservice request received from a client device, send the microservice output for that request to the client device from which the microservice request was received;
a real-time financial microservice comprising a second plurality of programming instructions stored in the memory of, and operating on the processor of, each of the other computing devices of the distributed network of computing devices wherein the second plurality of programming instructions causes the computing device on which it is installed to:
  receive a first microservice request comprising a financial action request from the cluster manager, the financial action request comprising a restaurant identifier and a first parameter for optimization;
  using the restaurant identifier, retrieve from the restaurant database, responsive to the received financial action request, operations data for the restaurant comprising financial information, inventory information, staffing information, and patron information;
  process the retrieved information through a first machine learning algorithm to determine an optimal inventory level, an optimal staffing level, and an optimal payment schedule for the restaurant based on the parameter for optimization;
  create a first microservice output comprising the determined optimal inventory level, staffing level, and payment schedule for the restaurant; and
  send the first microservice output to the cluster manager;
an advanced inventory management microservice comprising a third plurality of programming instructions stored in the memory of, and operating on the processor of, each of the other computing devices of the distributed network of computing devices wherein the third plurality of programming instructions causes the computing device on which it is installed to:
  receive a second microservice request comprising an inventory request comprising the restaurant identifier;
  using the restaurant identifier, retrieve from the restaurant database, responsive to the received inventory request, inventory data comprising financial information, inventory information, staffing information, and patron information;
  process the retrieved information through a second machine learning algorithm to determine a quantity of items to be purchased;

retrieve third-party data selected from the list of: local news and events, current and forecast weather, a social media posting, and a rating or review;
generate a smart shopping list for the restaurant based on the determined quantity of items to be purchased and the third party data, the smart shopping list comprising a;
break-even point a dynamic point of reorder; and
create a second microservice output comprising the generated shopping list for the restaurant; and
send the second microservice output to the cluster manager;
a food production management microservice comprising a fourth plurality of programming instructions stored in the memory of, and operating on the processor of, each of the other computing devices of the distributed network of computing devices wherein the fourth plurality of programming instructions causes the computing device on which it is installed to:
receive a third microservice request comprising a food order request comprising the restaurant identifier;
using the restaurant identifier, retrieve from the restaurant database, responsive to the received food order request, food preparation data for the restaurant comprising food items and preparation times;
process the retrieved information through a third machine learning algorithm to:
coordinate the preparation of food items in a food order in a food preparation area;
generate a predicted food order ready time;
coordinate the packaging of the food items in the food order; and
generate a predicted packaged food order ready time; and
create a third microservice output comprising the predicted food order ready time and predicted packaged food order ready time for the food order; and
send the third microservice output to the cluster manager; and
an operations microservice comprising a fifth plurality of programming instructions stored in the memory of, and operating on the processor of, each of the other computing devices of the distributed network of computing devices wherein the fifth plurality of programming instructions causes the computing device on which it is installed to:
receive a fourth microservice request comprising a reservation request comprising the restaurant identifier, a reservation time, and current seating data for the restaurant comprising information describing a plurality of patrons that are currently seated at tables in the restaurant;
using the restaurant identifier, retrieve from the restaurant database, responsive to the received reservation request, patron information comprising historical seating data for the restaurant;
calculate a preliminary table turn-time estimate comprising an estimate of when a table will become available to satisfy the request for a reservation, wherein the preliminary table turn-time estimate is based at least in part on the historical seating data, the current seating data, and the reservation time;
create a fourth microservice output comprising the preliminary table turn-time estimate; and
send the fourth microservice output to the cluster manager.

2. The system of claim 1, further comprising a real-time staffing management microservice comprising a sixth plurality of programming instructions stored in the memory of, and operating on the processor of, each of the other computing devices of the distributed network of computing devices wherein the sixth plurality of programming instructions causes the computing device on which it is installed to:
receive a fourth microservice request comprising a staffing request;
using the restaurant identifier, retrieve from the restaurant database, responsive to the received staffing request, operations data for the restaurant comprising inventory information, staffing information, and patron information;
process the retrieved information through a fourth machine learning algorithm to determine an optimal staffing schedule;
create a fifth microservice output comprising the optimal staffing schedule; and
send the fifth microservice output to the cluster manager.

3. The system of claim 1, further comprising an optimized routing for food delivery microservice comprising a seventh plurality of programming instructions stored in the memory of, and operating on the processor of, each of the other computing devices of the distributed network of computing devices wherein the seventh plurality of programming instructions causes the computing device on which it is installed to:
receive a fifth microservice request comprising a routing request comprising a restaurant location and a delivery location;
retrieve map data from a third party map data provider on the Internet;
process the restaurant location, the delivery location, and the map data through a fifth machine learning algorithm to:
generate an optimal food delivery route;
create a sixth microservice output comprising the optimal food delivery route; and
send the sixth microservice output to the cluster manager.

4. A method for operating a restaurant-as-a-service platform, comprising the steps of:
using a cluster manager operating on a first computing device of a distributed network of computing devices configured to operate as a single platform wherein each computing device of the distributed network comprises a memory a processor, and a non-volatile data storage device to:
receive microservice requests from client devices;
distribute the microservice requests to computing devices of the distributed network of computing devices using a load balancing algorithm;
receive microservice outputs from the distributed microservice requests; and
for each microservice request received from a client device, send the microservice output for that request to the client device from which the microservice request was received;
using a real-time financial microservice operating on each of the other computing devices of the distributed network of computing devices to:
receive a first microservice request comprising a financial action request from the cluster manager, the financial action request comprising a restaurant identifier and a first parameter for optimization;

using the restaurant identifier, retrieve from a restaurant database stored on the non-volatile data storage device of one or more of the computing devices of the distributed network of computing devices, the restaurant database comprising financial information, inventory information, staffing information, patron information, and food preparation data for each of a plurality of restaurants, responsive to the received financial action request, operations data for the restaurant comprising financial information, inventory information, staffing information, and patron information;

process the retrieved information through a first machine learning algorithm to determine an optimal inventory level, an optimal staffing level, and an optimal payment schedule for the restaurant based on the parameter for optimization;

create a first microservice output comprising the determined optimal inventory level, staffing level, and payment schedule for the restaurant; and send the first microservice output to the cluster manager;

using an advanced inventory management microservice operating on each of the other computing devices of the distributed network of computing devices to:

receive a second microservice request comprising an inventory request comprising the restaurant identifier;

using the restaurant identifier, retrieve from the restaurant database, responsive to the received inventory request, inventory data comprising financial information, inventory information, staffing information, and patron information;

process the retrieved information through a second machine learning algorithm to determine a quantity of items to be purchased;

retrieve third-party data selected from the list of: local news and events, current and forecast weather, a social media posting, and a rating or review;

generate a smart shopping list for the restaurant based on the determined quantity of items to be purchased and the third party data, the smart shopping list comprising a dynamic point of reorder; and create a second microservice output comprising the generated smart shopping list for the restaurant; and send the second microservice output to the cluster manager;

using a food production management microservice operating on each of the other computing devices of the distributed network of computing devices to:

receive a third microservice request comprising a food order request comprising the restaurant identifier;

using the restaurant identifier, retrieve from the restaurant database, responsive to the received food order request, food preparation data for the restaurant comprising food items and preparation times;

process the retrieved information through a third machine learning algorithm to:

coordinate the preparation of food items in a food order in a food preparation area;

generate a predicted food order ready time;

coordinate the packaging of the food items in the food order; and generate a predicted packaged food order ready time; and create a third microservice output comprising the predicted food order ready time and predicted packaged food order ready time for the food order; and send the third microservice output to the cluster manager; and using an operations microservice operating on each of the other computing devices of the distributed network of computing devices to:

receive a fourth microservice request comprising a reservation request comprising the restaurant identifier, a reservation time, and current seating data for the restaurant comprising information describing a plurality of patrons that are currently seated at tables in the restaurant;

using the restaurant identifier, retrieve from the restaurant database, responsive to the received reservation request, patron information comprising historical seating data for the restaurant;

calculate a preliminary table turn-time estimate comprising an estimate of when a table will become available to satisfy the request for a reservation, wherein the preliminary table turn-time estimate is based at least in part on the historical seating data, the current seating data, and the reservation time;

create a fourth microservice output comprising the preliminary table turn-time estimate; and send the fourth microservice output to the cluster manager.

5. The method of claim 4, further comprising the steps of:

using a real-time staffing management microservice operating on each of the other computing devices of the distributed network of computing devices to:

receive a fourth microservice request comprising a staffing request;

using the restaurant identifier, retrieve from the restaurant database, responsive to the received staffing request, operations data for the restaurant comprising inventory information, staffing information, and patron information;

process the retrieved information through a fourth machine learning algorithm to determine an optimal staffing schedule;

create a fifth microservice output comprising the optimal staffing schedule; and send the fifth microservice output to the cluster manager.

6. The method of claim 4, further comprising the steps of:

using an optimized routing for food delivery microservice operating on each of the other computing devices of the distributed network of computing devices to:

receive a fifth microservice request comprising a routing request comprising a restaurant location and a delivery location;

retrieve map data from a third party map data provider on the Internet;

process the restaurant location, the delivery location, and the map data through a fifth machine learning algorithm to:

generate an optimal food delivery route;

create a sixth microservice output comprising the optimal food delivery route; and send the sixth microservice output to the cluster manager.

* * * * *